June 26, 1956

A. J. EVERS 2,751,731

BANDING MACHINE FOR BAG BUNDLES

Filed July 8, 1953

INVENTOR.
Arthur J. Evers.
BY
Thomas E. Tate
Agent

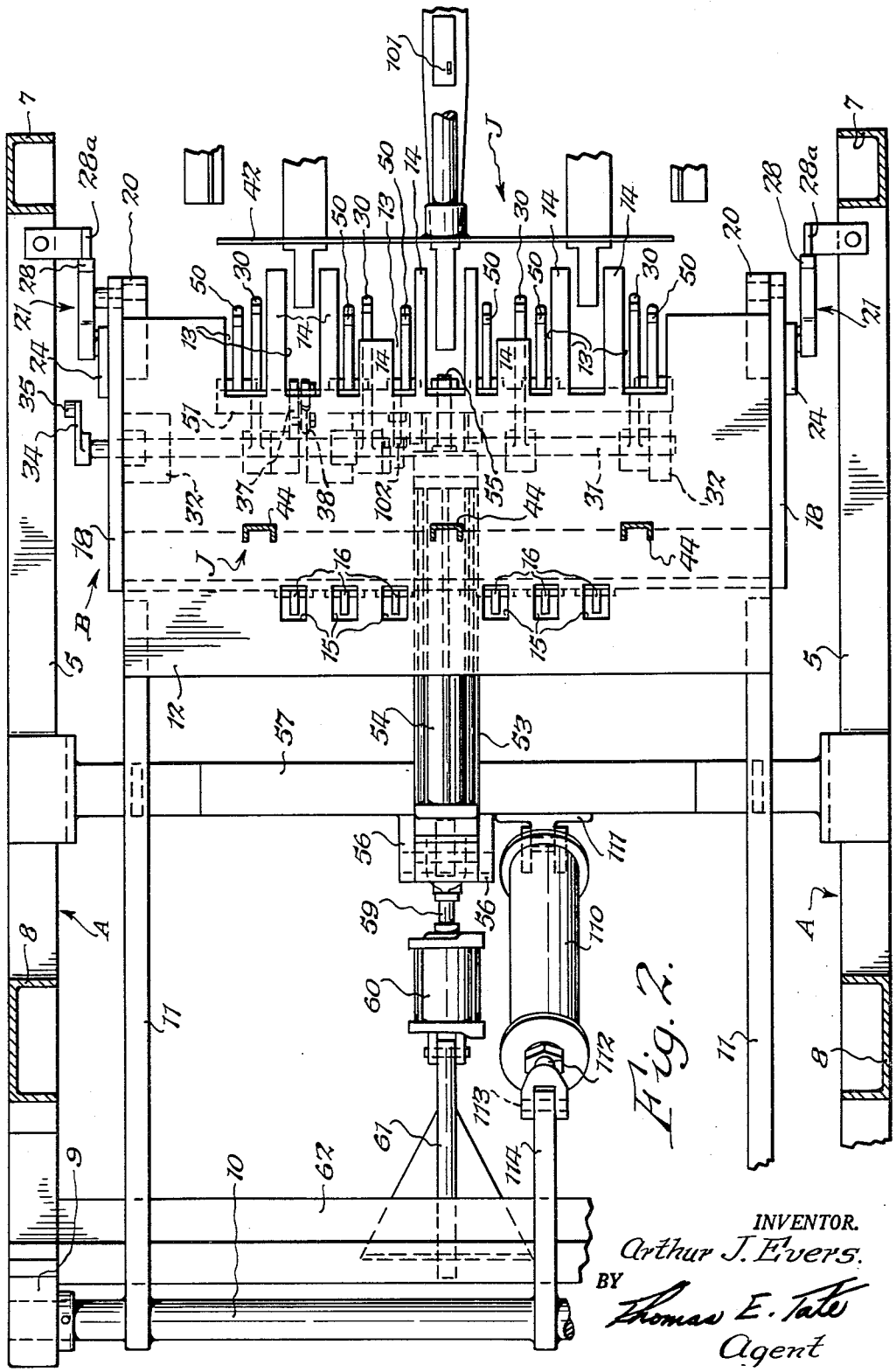

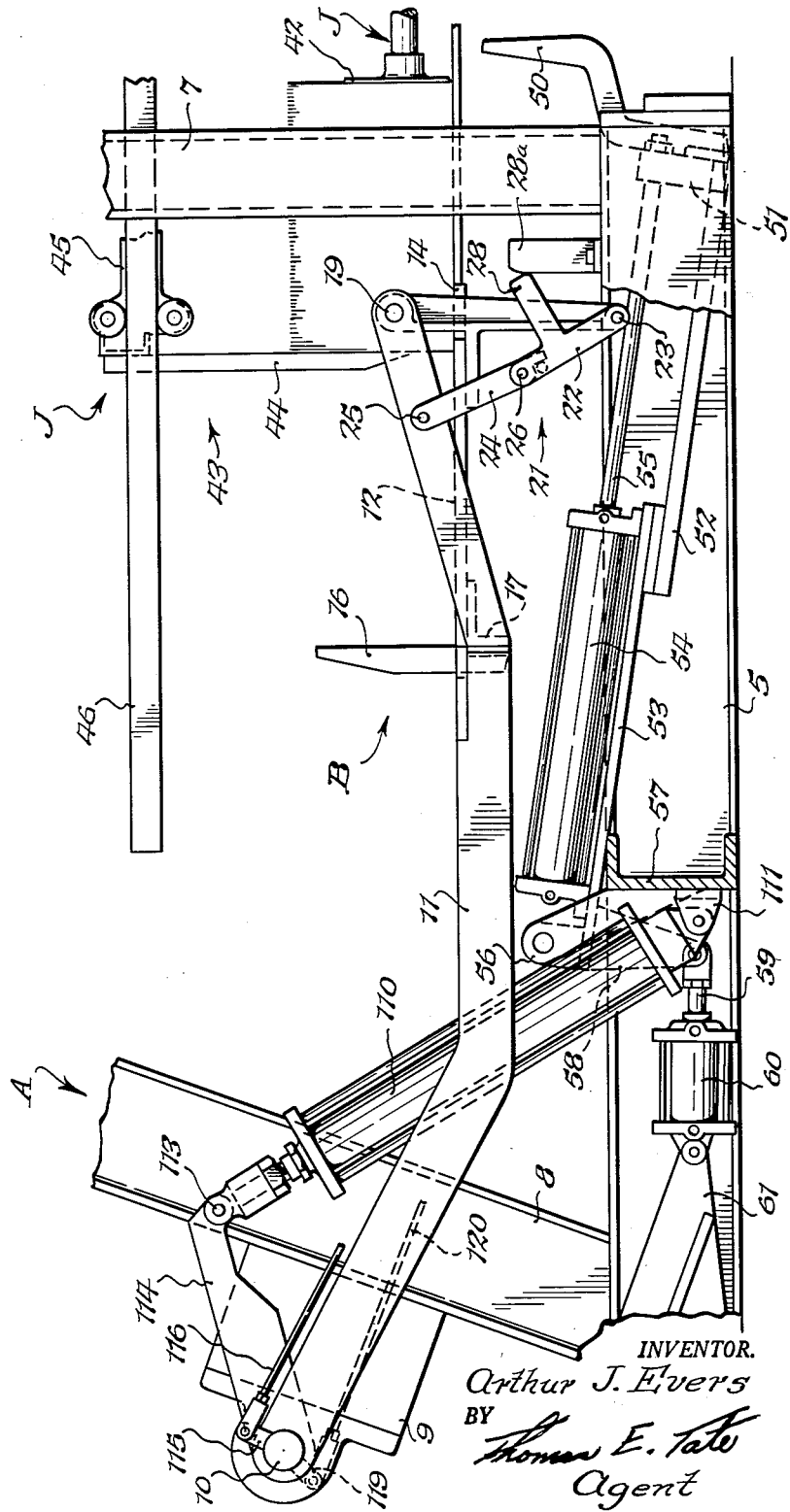

June 26, 1956   A. J. EVERS   2,751,731
BANDING MACHINE FOR BAG BUNDLES
Filed July 8, 1953   20 Sheets-Sheet 4
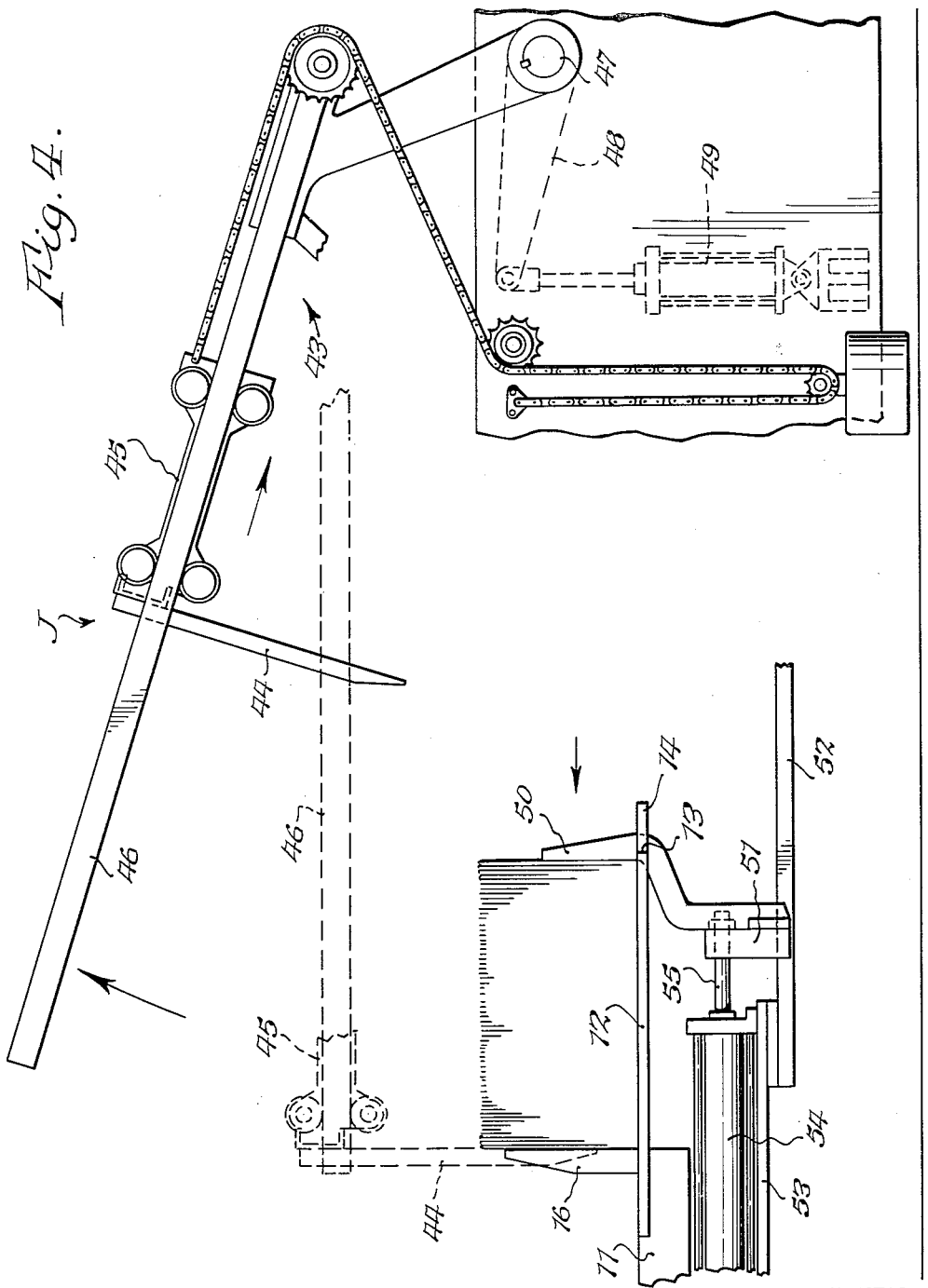
INVENTOR.
Arthur J. Evers
BY
Thomas E. Tate
Agent

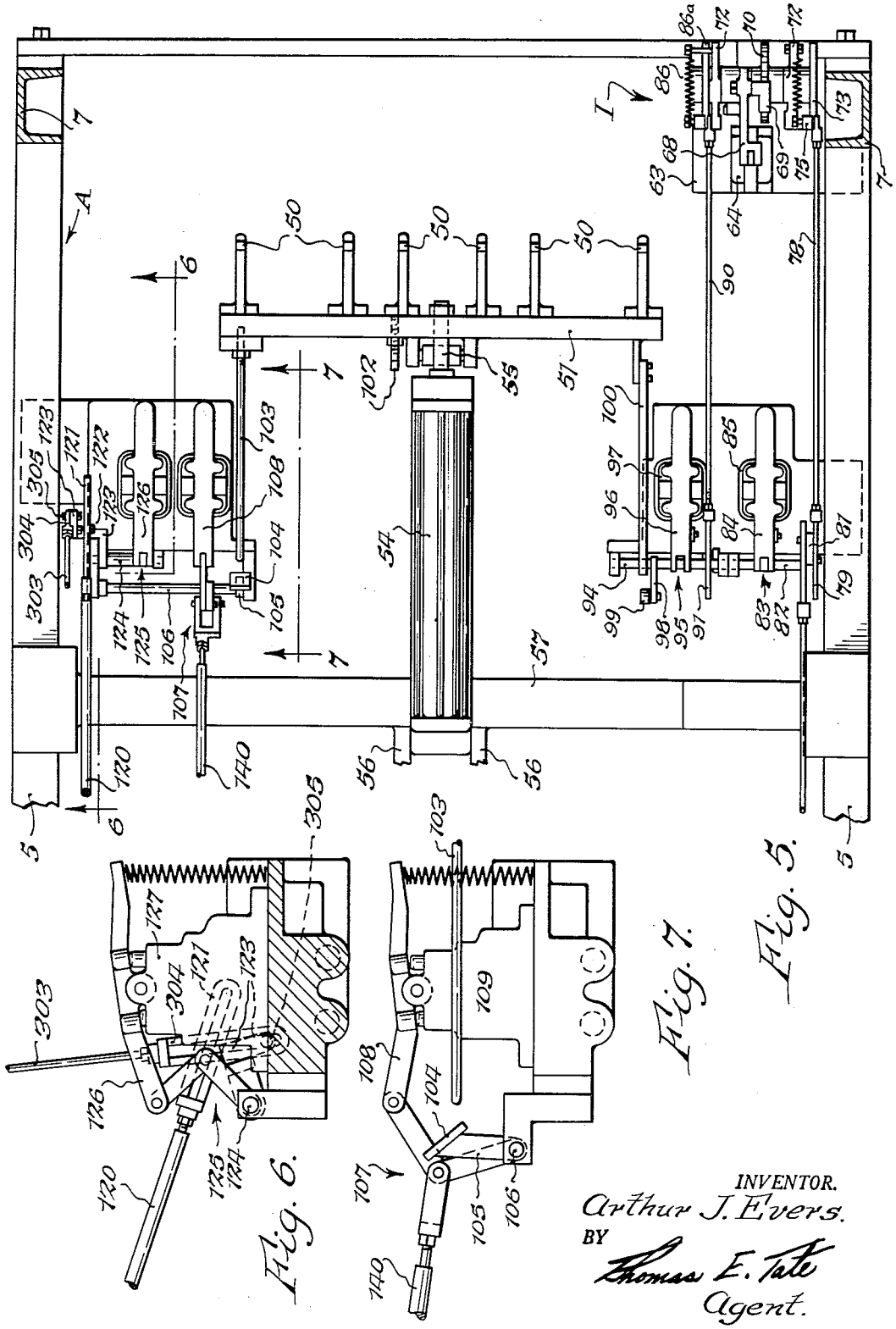

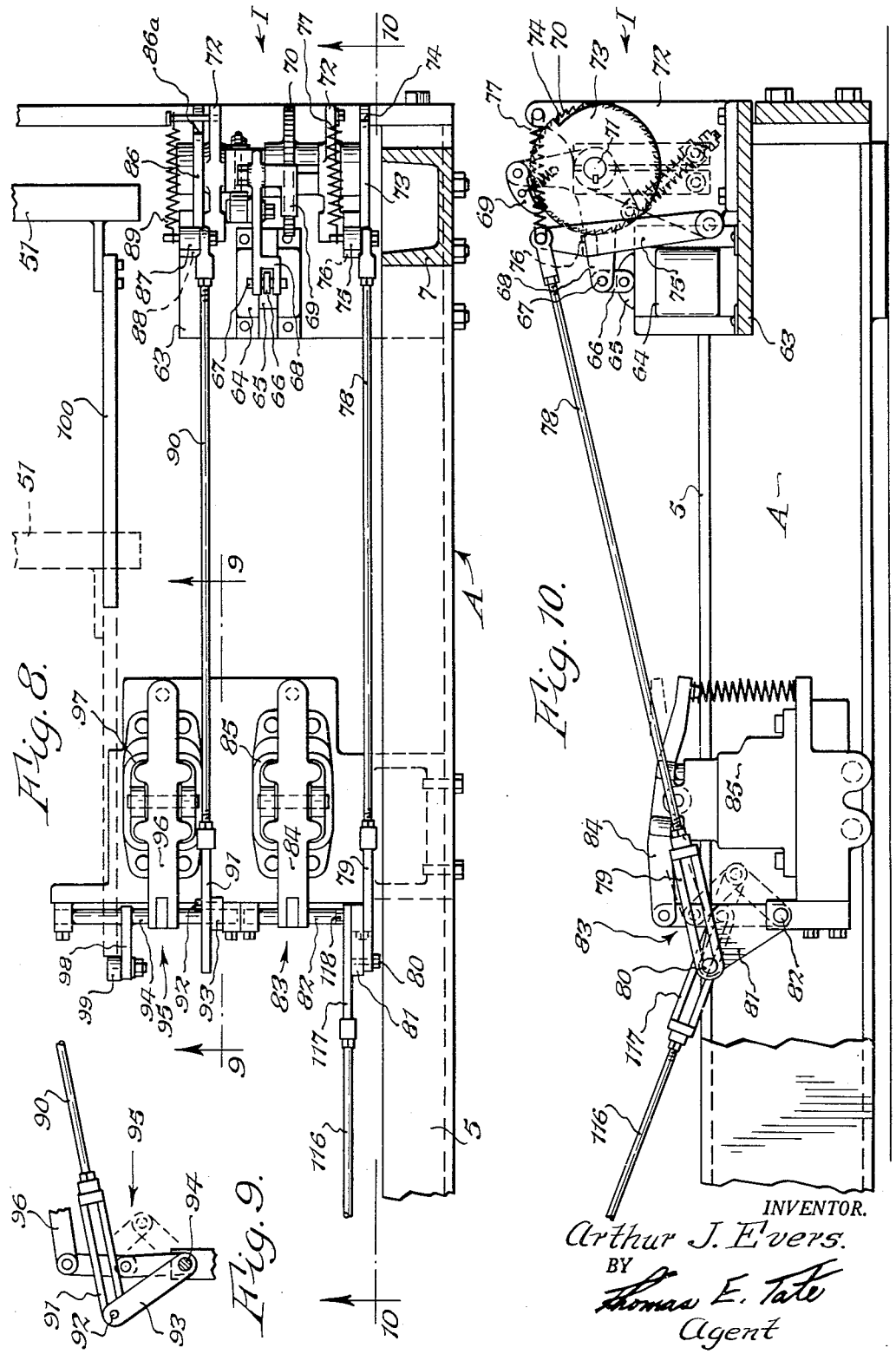

June 26, 1956 A. J. EVERS 2,751,731
BANDING MACHINE FOR BAG BUNDLES
Filed July 8, 1953 20 Sheets-Sheet 7
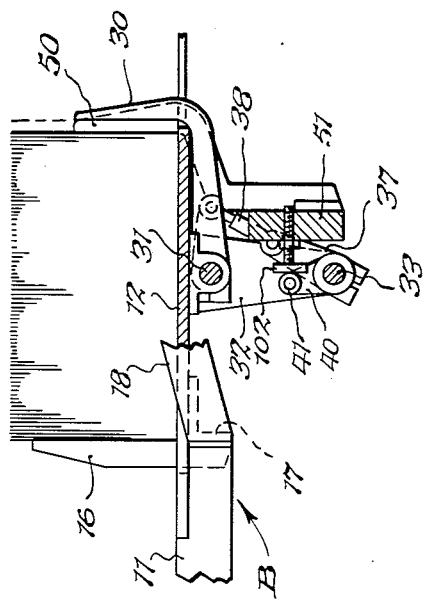
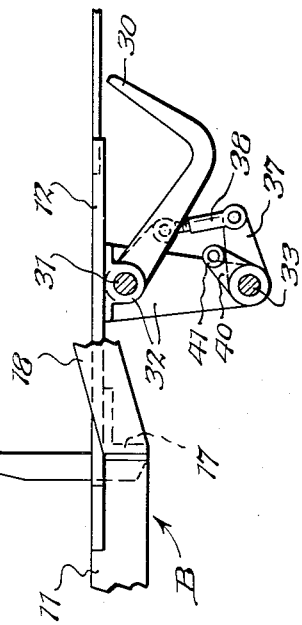
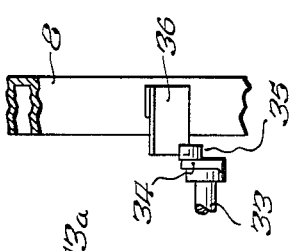
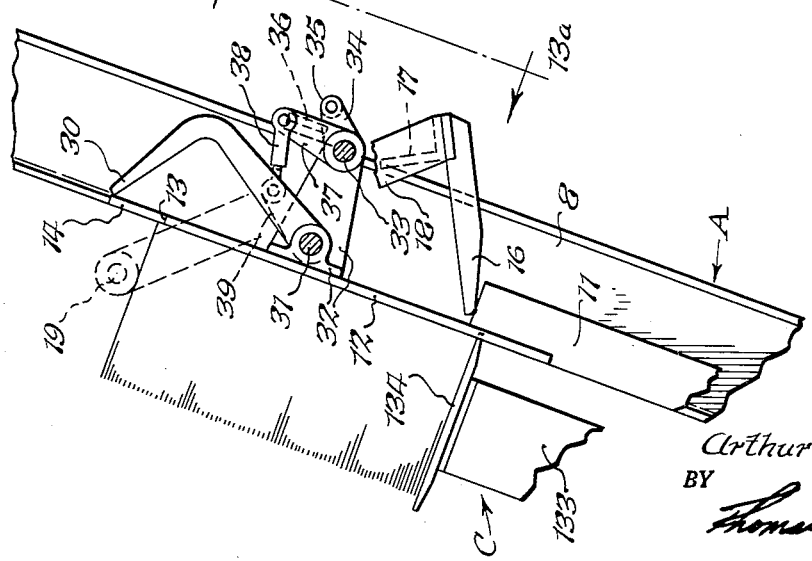
INVENTOR.
Arthur J. Evers.
BY
Thomas E. Tate
Agent June 26, 1956  A. J. EVERS  2,751,731
BANDING MACHINE FOR BAG BUNDLES
Filed July 8, 1953  20 Sheets-Sheet 8
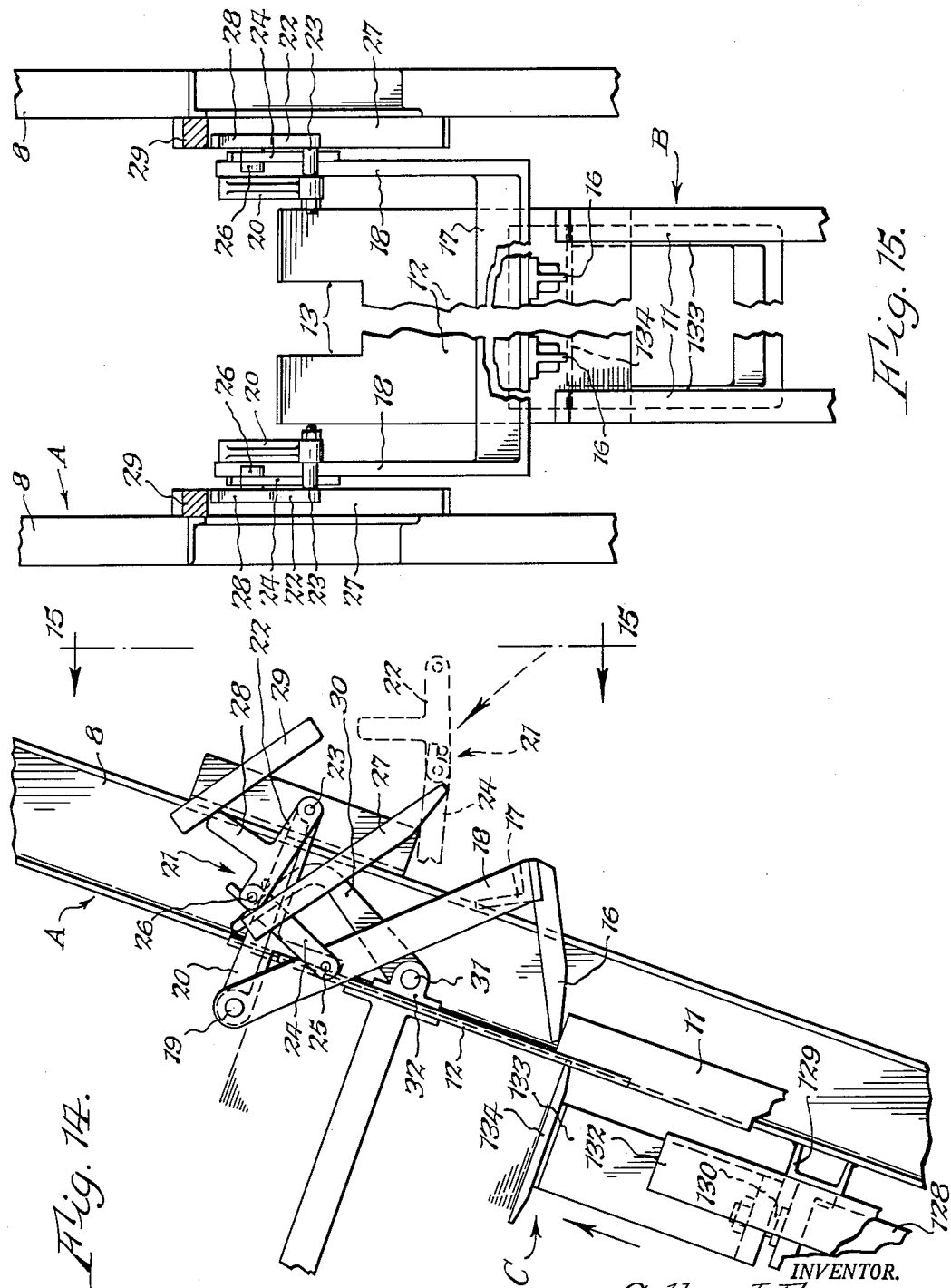

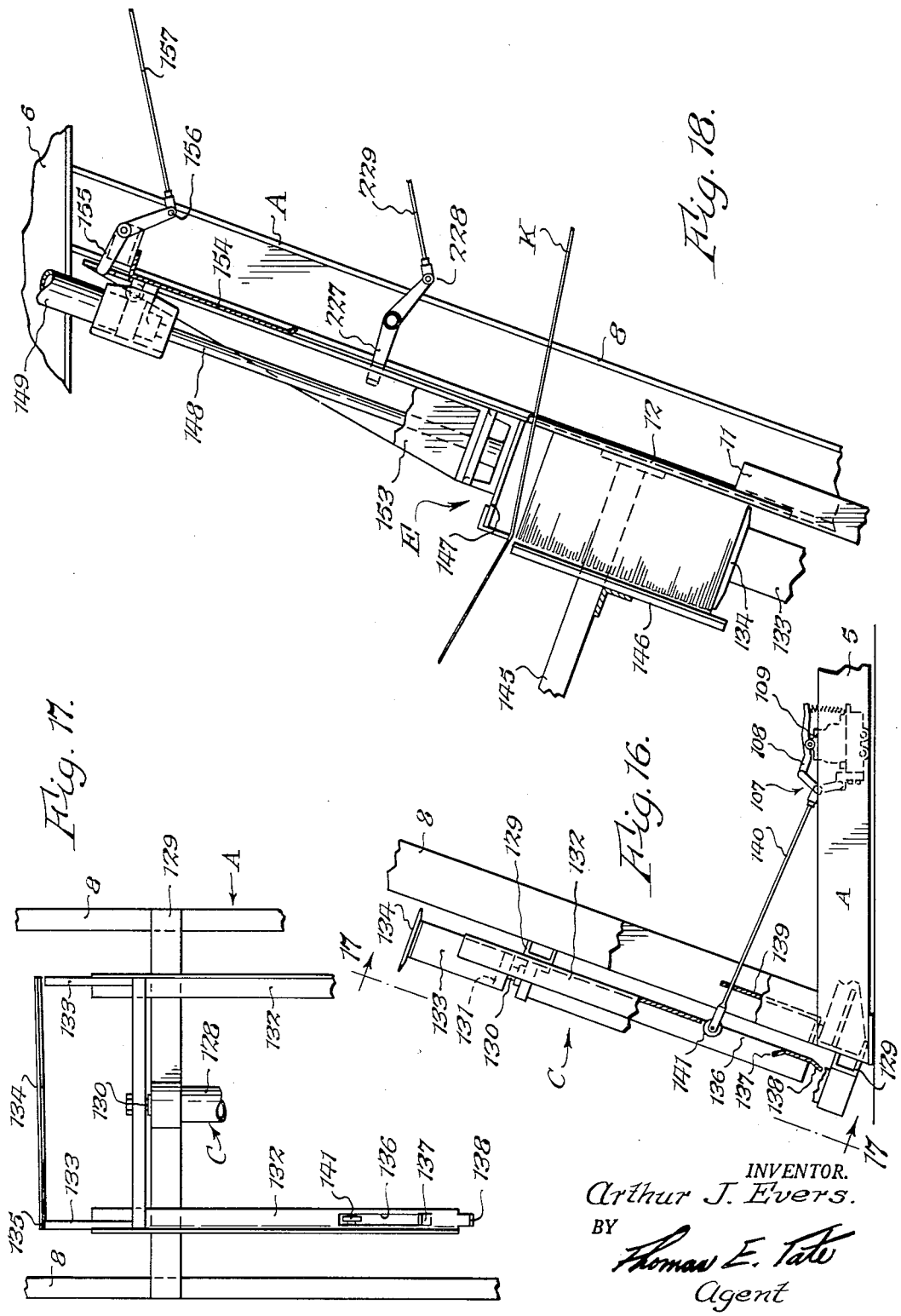

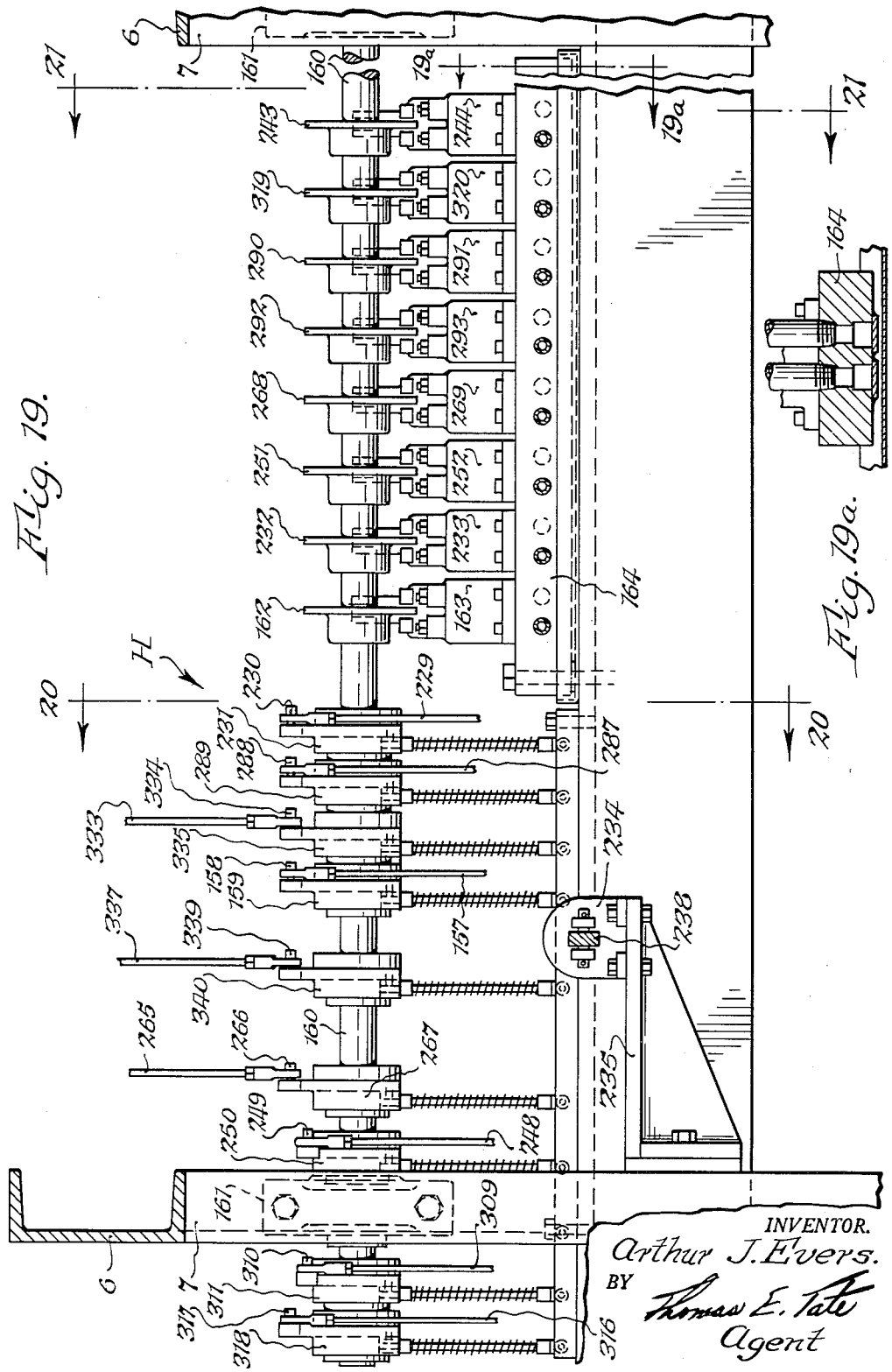

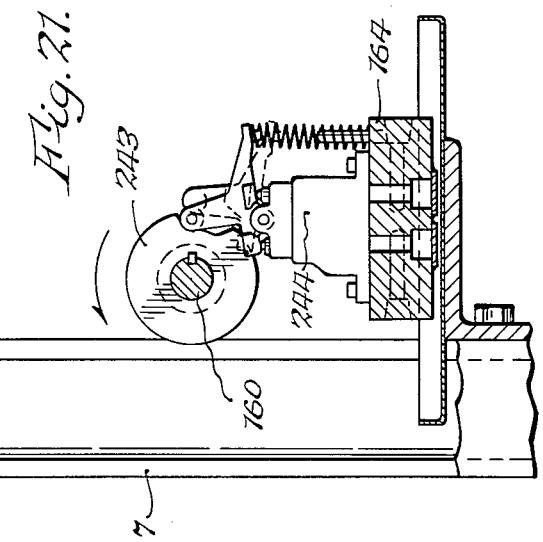

June 26, 1956 A. J. EVERS 2,751,731
BANDING MACHINE FOR BAG BUNDLES
Filed July 8, 1953 20 Sheets-Sheet 12

INVENTOR.
Arthur J. Evers
BY
Thomas E. Tate
Agent

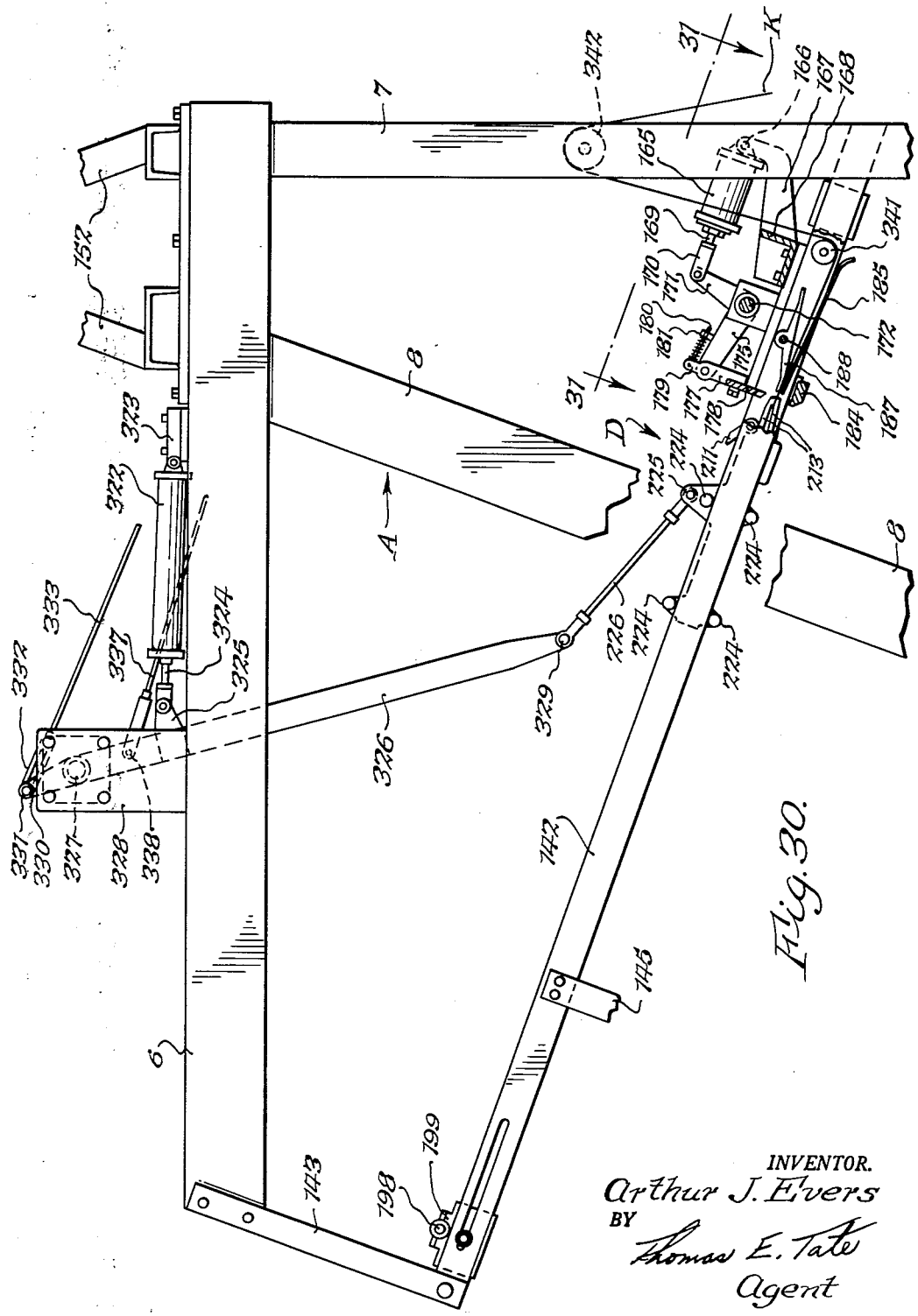

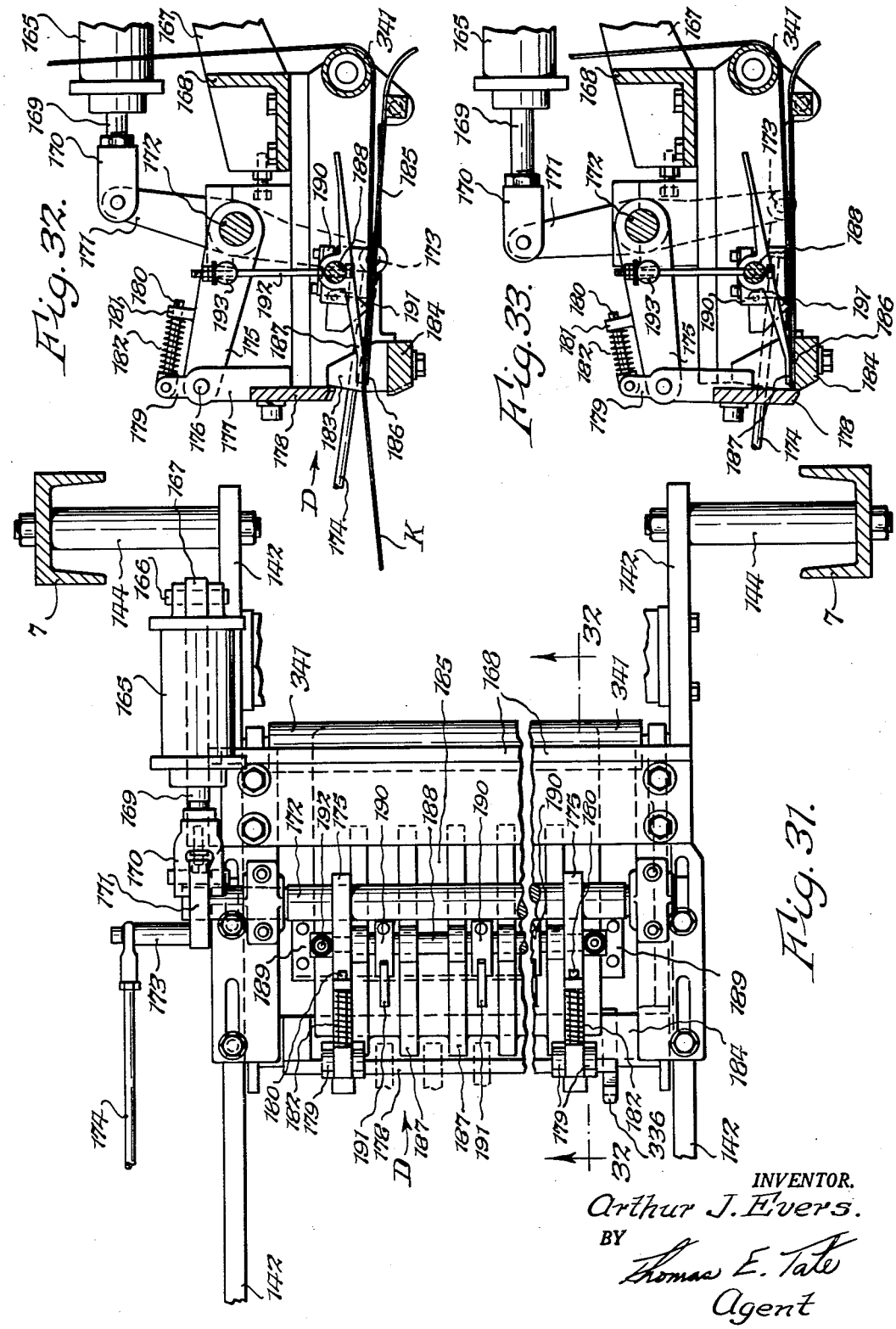

June 26, 1956
A. J. EVERS
2,751,731
BANDING MACHINE FOR BAG BUNDLES
Filed July 8, 1953
20 Sheets-Sheet 15
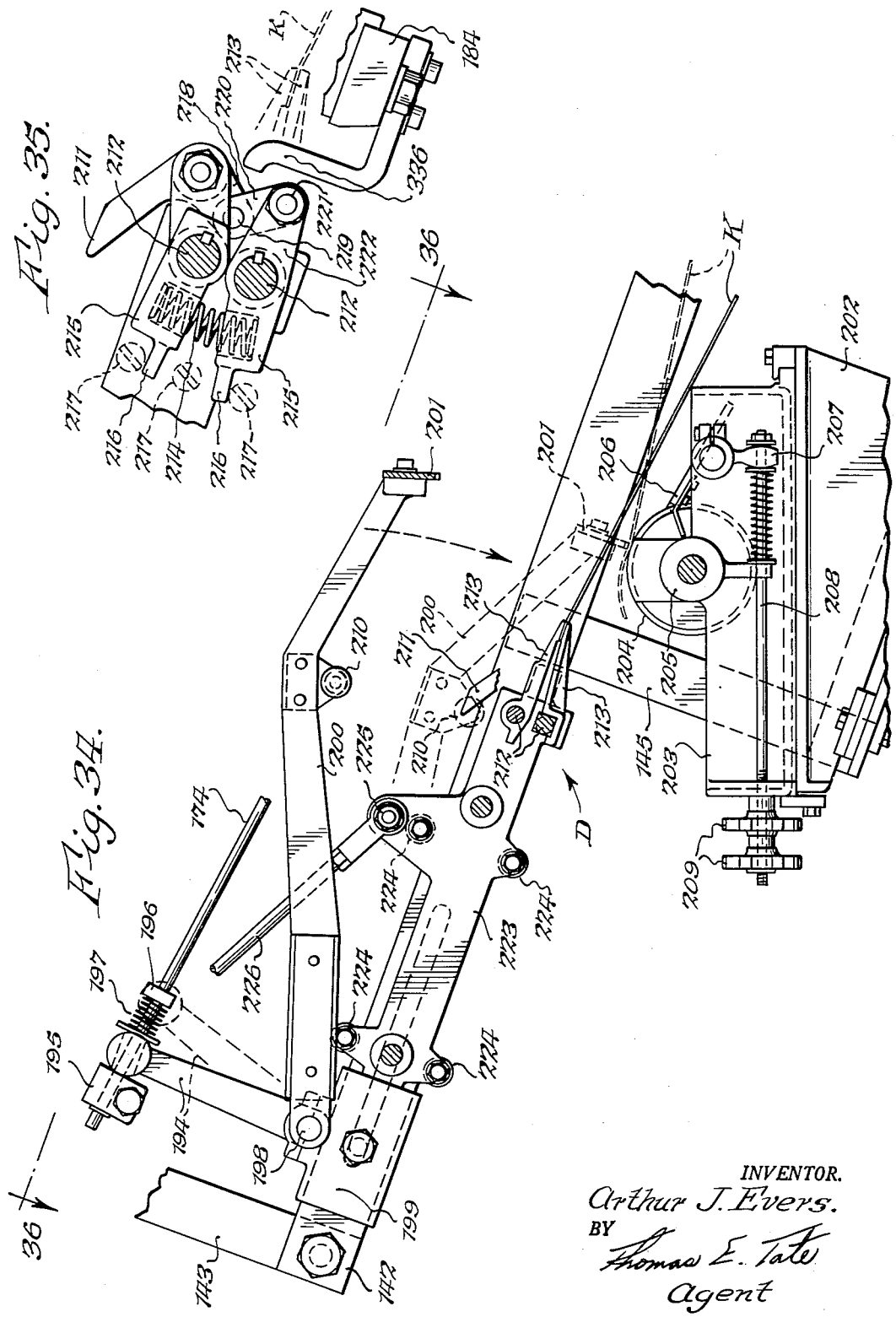
INVENTOR.
Arthur J. Evers.
BY
Thomas E. Tate
Agent June 26, 1956 A. J. EVERS 2,751,731
BANDING MACHINE FOR BAG BUNDLES
Filed July 8, 1953 20 Sheets-Sheet 16
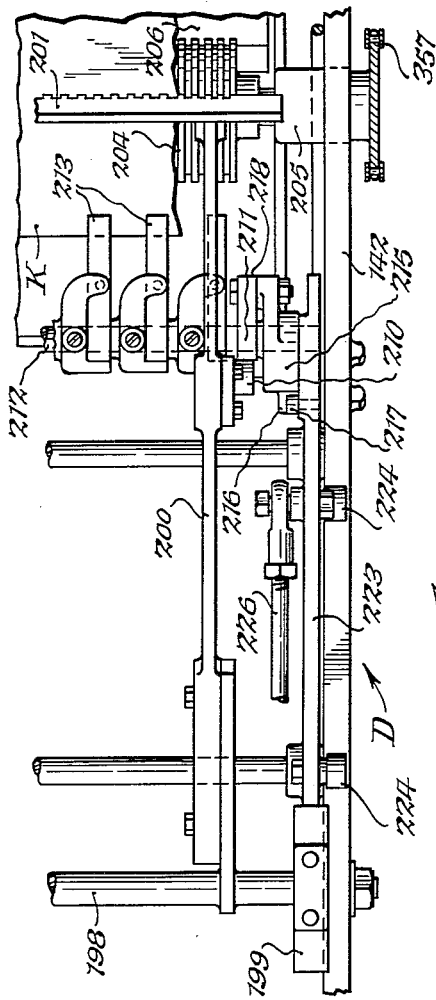
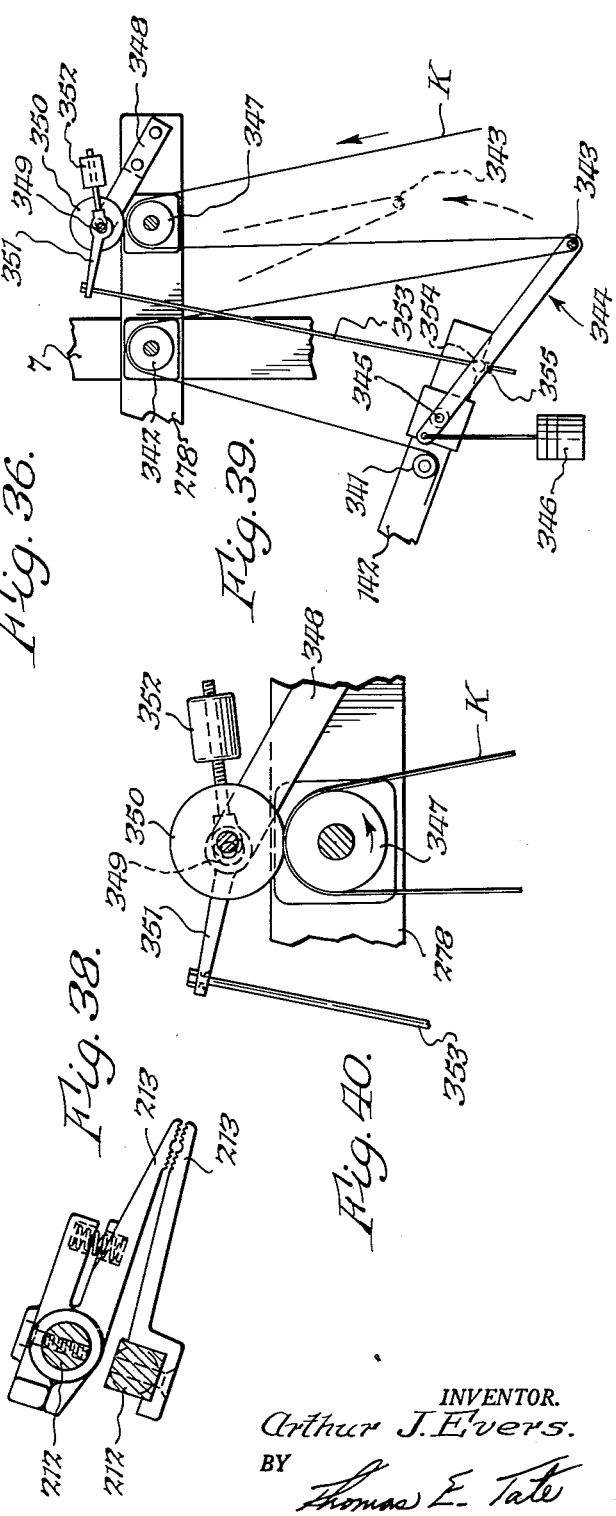
INVENTOR.
Arthur J. Evers.
BY Thomas E. Tate
Agent

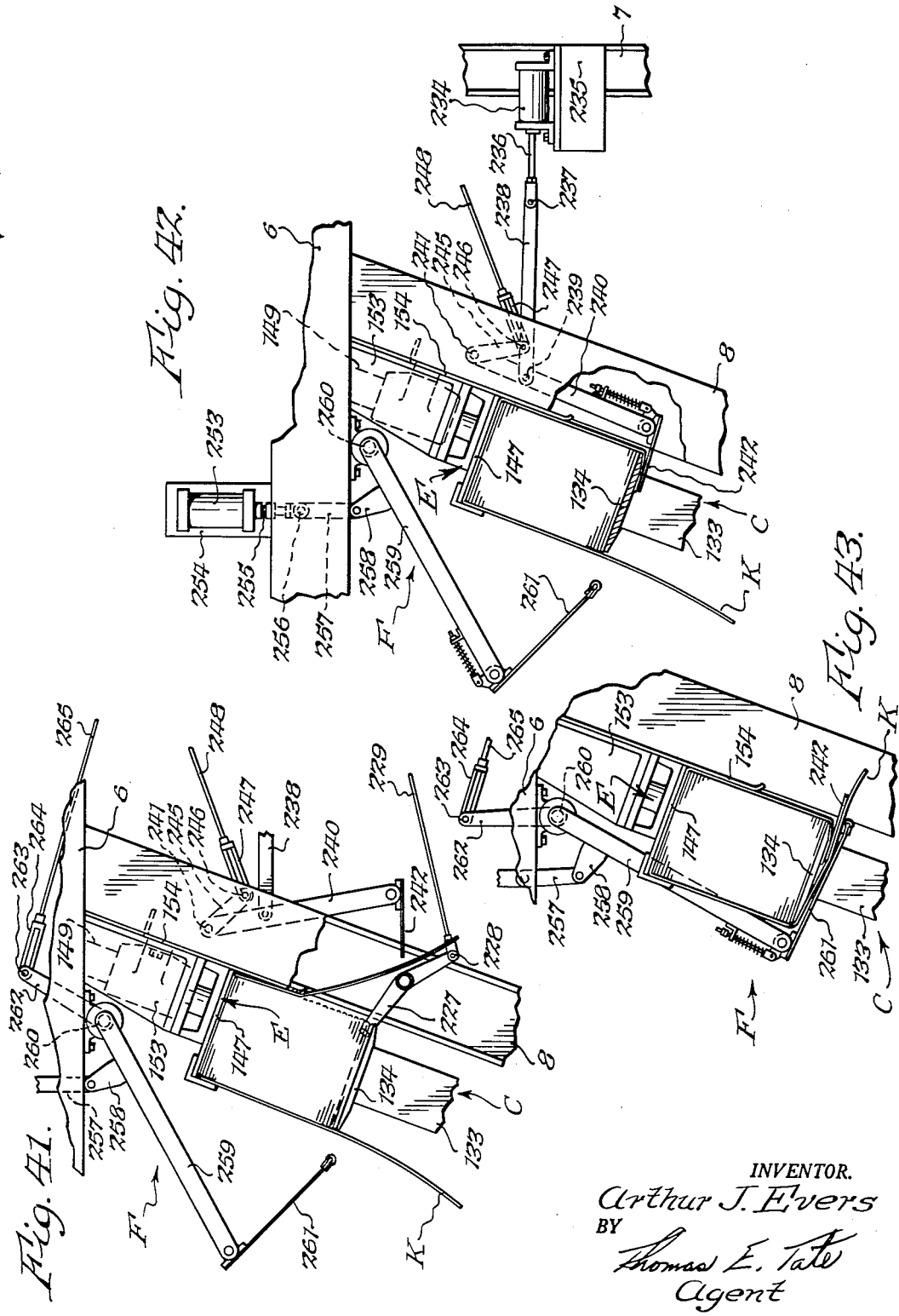

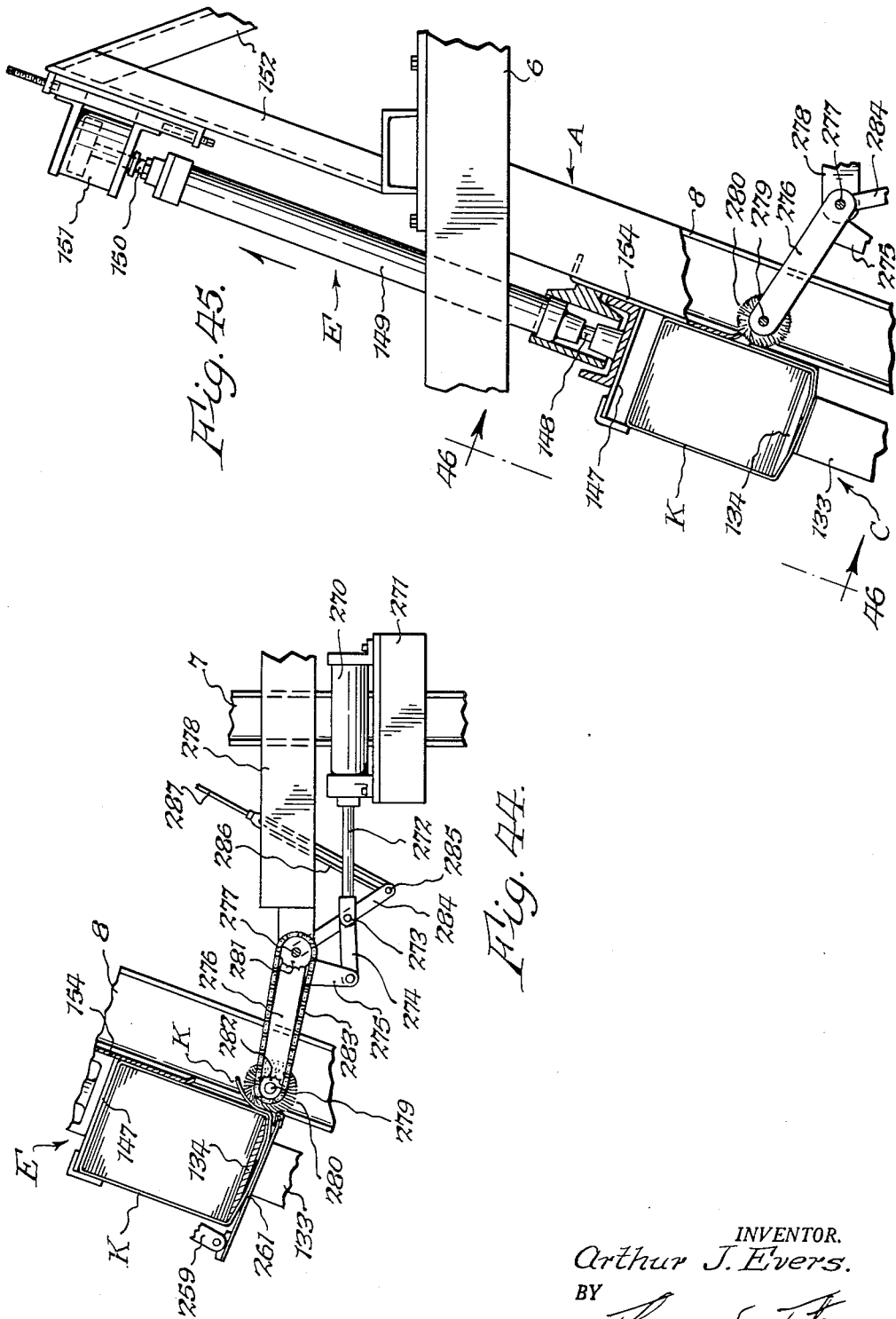

June 26, 1956    A. J. EVERS    2,751,731
BANDING MACHINE FOR BAG BUNDLES
Filed July 8, 1953    20 Sheets-Sheet 19
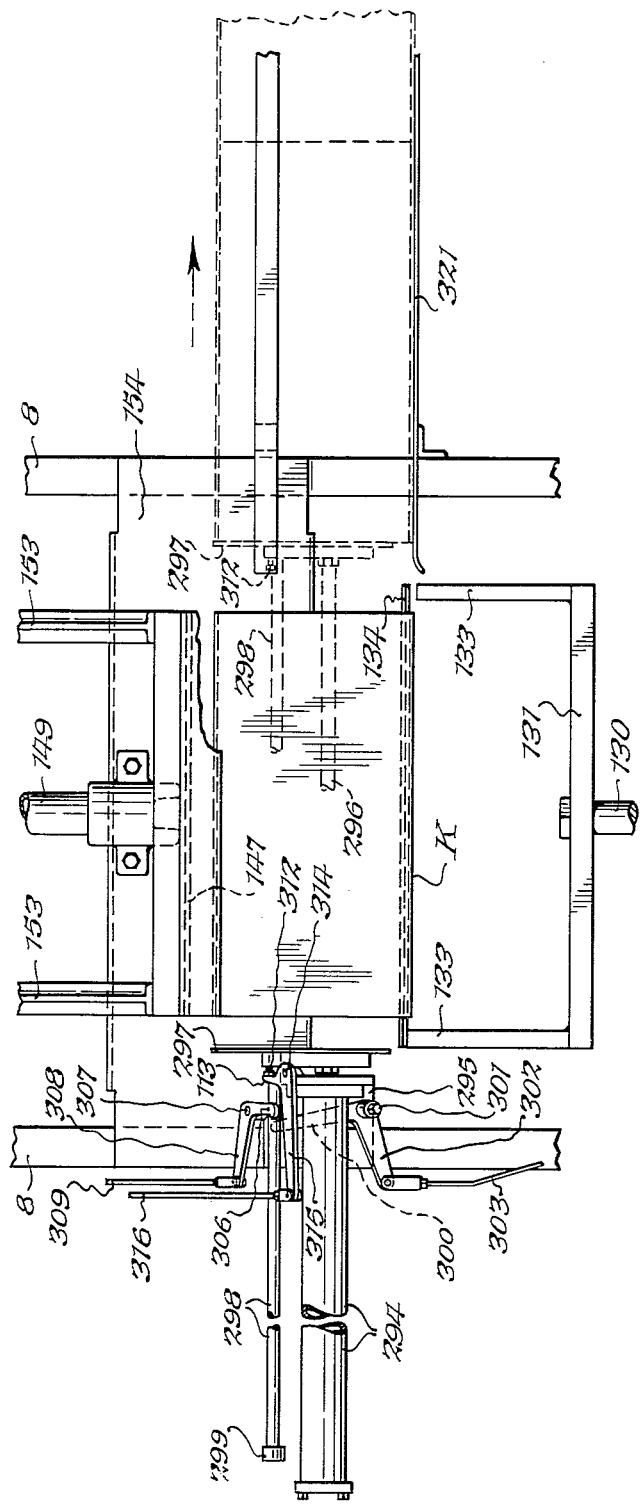
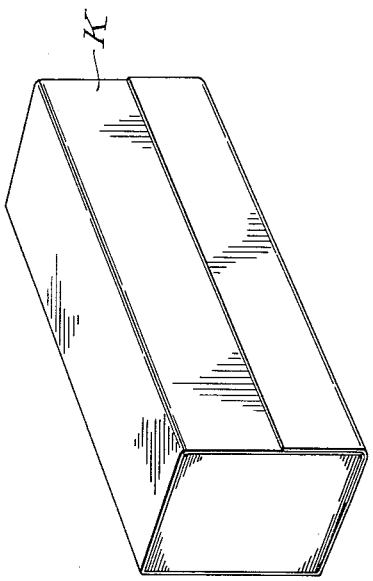
INVENTOR.
Arthur J. Evers
BY
Thomas E. Tate
Agent

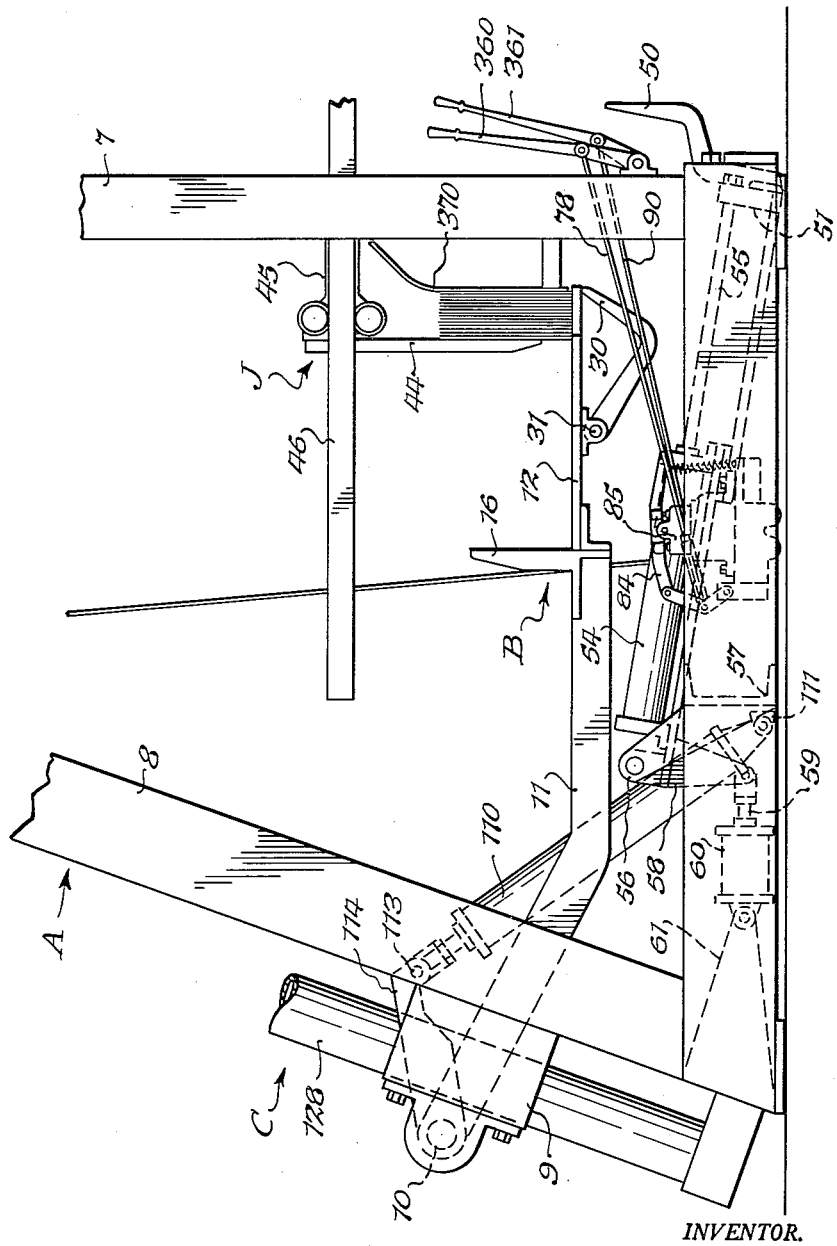

United States Patent Office 2,751,731
Patented June 26, 1956

2,751,731

BANDING MACHINE FOR BAG BUNDLES

Arthur J. Evers, Brooklyn, N. Y., assignor to International Paper Company, New York, N. Y., a corporation of New York Application July 8, 1953, Serial No. 366,805

13 Claims. (Cl. 53—124)

This invention relates to new and useful improvements in banding machines and particularly seeks to provide a novel machine for automatically wrapping and securing a band of paper about a bundle of paper bags.

A machine constructed in accordance with this invention is intended to receive a loose bundle of bags from the delivery or transfer mechanisms of an associated bagmaking machine, move the bundle to a wrapping station, compress the bundle, wrap the same with a band of paper and discharge the wrapped bundle from the machine.

An object of this invention, therefore, is to provide a machine capable of performing the abovementioned functions which includes means for removing a bundle of bags from the delivery or transfer mechanisms of an associated bagmaking machine onto a cyclically operable supporting basket movable through an arcuate path from the bundle-receiving position to a wrapping station.

Another object of this invention is to provide a machine of the character stated in which the bag bundle is delivered onto a ram- or elevator-mounted cantilever supporting plate in preparation for compression of the bundles.

A further object of this invention is to provide a machine of the character stated in which the cantilever bag bundle supporting plate is movable upwardly against the resistance of a hydraulically operable plunger or presser foot overlying a web of wrapping paper whereby to compress the bag bundle and to move it bodily upwardly into banding position.

A further object of this invention is to provide a machine of the character stated in which means are provided for cutting off a strip of wrapping paper from a supply roll thereof after the bag bundle has been compressed and for wrapping the cut off length of paper about the compressed bundle and adhesively securing same.

A further object of this invention is to provide a machine of the character stated in which the lateral fingers of the cyclically operable bundle supporting basket are displaced out of the path of movement of the upwardly movable cantilever supporting plate prior to the time at which its upward movement commences.

A further object of this invention is to provide a machine of the character stated in which mechanical compression of the bag bundle is released following completion of application of the band of wrapping paper therearound whereby to cause the band of wrapping paper to retain the bag bundle under a slightly lesser degree of compression.

A further object of this invention is to provide a machine of the character stated in which the wrapped bundle of bags is ejected laterally from the cantilever supporting plate.

Another object of this invention is to provide a machine of the character stated in which a fresh supply of wrapping or banding paper is automatically withdrawn from a supply roll thereof following completion of the banding operation on the preceding bag bundle and its ejection from the machine.

Another object of this invention is to provide a machine of the character stated in which means are provided for sequentially operating the various moving parts of the machine and in which the operation of one part automatically prepares the control mechanism for operation of each succeeding part until one complete cycle of operation has been effected.

Another object of this invention is to provide a machine of the character stated in which the sequential control thereof is effected through the use of an indexing shaft operatively connected to certain of the moving parts by a plurality of individually-operable connecting links and ratchet wheels and operatively connected to a plurality of control valves sequentially operable as the indexing shaft is rotated in step by step movements as a result of successive actuation of the several indexing ratchets.

With these and other objects in view, the nature of which will be more apparent, the invention will be more fully understood by reference to the drawings, the accompanying detailed description and the appended claims.

In the drawings,

Fig. 2 is an enlarged horizontal section taken along line 2—2 of Fig. 1 but with the bag bundle removed in order more clearly to illustrate the underlying mechanisms;

Fig. 3 is an enlarged fragmentary side elevation, partly in section, showing the bag bundle receiving rack and certain of the associated devices from the bagmaking and transfer machine but in which the right hand fingers of the rack have not been shown in the interest of clarity;

Fig. 4 is an enlarged fragmentary side elevation of a portion of the mechanism shown in Fig. 3 and illustrates the actual receipt of a bag bundle on the rack;

Fig. 5 is an enlarged horizontal section taken along line 5—5 of Fig. 1;

Fig. 6 is an enlarged side elevation of the control valve and actuating linkages to control the elevator or ram which carries the cantilever bag bundle supporting plate;

Fig. 7 is an enlarged side elevation of a somewhat similar valve and its actuating linkages which control the arcuate movement of the rack;

Fig. 8 is a fragmentary enlarged view of that portion of the mechanism appearing in the lower part of Fig. 5;

Fig. 9 is a vertical section taken along line 9—9 of Fig. 8;

Fig. 10 is a vertical section taken along line 10—10 of Fig. 8;

Fig. 11 is a fragmentary side elevation of the rack and shows the right and left fingers thereof in their positions preparatory to the depositing of a bag bundle on the rack;

Fig. 12 is a view similar to Fig. 11, but shows the right hand fingers of the rack raised into bundle-clamping position;

Fig. 13 is a view similar to Figs. 11 and 12 but shows the positions of the rack fingers after the rack has been moved arcuately to deposit the bag bundle on the cantilever supporting plate;

Fig. 13a is a fragmentary angled elevation taken along the line 13a—13a of Fig. 13 and shows more of the details of the tripping device for retracting the right hand fingers of the rack;

Fig. 14 is an enlarged fragmentary side elevation showing the mechanisms by which the lefthand fingers of the rack are retracted as the rack reaches the position shown;

Fig. 15 is an elevational view of the parts shown in Fig. 14 and is taken along line 15—15 thereof;

Fig. 16 is a fragmentary side elevation of the elevator or ram and its associated linkage to its control valve;

Fig. 17 is an elevational view of the mechanism shown in Fig. 16 and is taken along line 17—17 thereof;

Fig. 18 is a fragmentary side elevation of the elevator or ram and the cantilever supporting plate as it appears just after having received a bundle of bags and prior to the commencement of any upward movement;

Fig. 19 is an enlarged fragmentary transverse section of the ratchet indexing devices and control valves for operating various of the moving parts of the machine;

Fig. 19a is a vertical section taken along line 19a—19a of Fig. 19 through the manifold upon which the control valves are mounted;

Fig. 20 is a detailed vertical section taken along line 20—20 of Fig. 19 and shows the details of the ratchet indexing devices for inducing step by step movement of the shaft shown in Fig. 19;

Fig. 21 is a detailed vertical section taken along line 21—21 of Fig. 19 and presents a typical showing of the control valves;

Fig. 22 is a side elevation of the control cam for the paper gripper;

Fig. 23 is a similar view of the control cam for the bag bundle ejector;

Fig. 24 is a similar view of the control cam for the large upper hydraulic compression cylinder;

Fig. 25 is a similar view of the control cam for actuation of the brush;

Fig. 26 is a similar view of the control cam for the front tucker fingers;

Fig. 27 is a similar view of the control cam for the rear tucker fingers;

Fig. 28 is a similar view of the control cam for the paper cutting knife;

Fig. 30 is an enlarged fragmentary side elevation, partly in section, showing the paper gripper, paper knife and the hydraulic cylinders for actuation thereof;

Fig. 31 is an enlarged plan view, partly in section, taken along line 31—31 of Fig. 30;

Fig. 32 is a vertical section taken along line 32—32 of Fig. 31 and shows the knife in the raised position;

Fig. 33 is a view similar to Fig. 32, but shows the knife in the down position after a cutting stroke has been completed;

Fig. 34 is an enlarged fragmentary side elevation of the paper grippers and shows the trolley mounting therefor and the glue applicator roll over which the paper is drawn;

Fig. 35 is an enlarged fragmentary transverse section of the grippers when in a position similar to that shown in Fig. 30;

Fig. 36 is a plan view of the mechanism shown in Fig. 34 and taken along line 36—36 thereof.

Fig. 37 is a view generally similar to Fig. 35, but shows the grippers in their released position;

Fig. 38 is an enlarged transverse detail section showing the spring loaded construction of the grippers per se;

Fig. 39 is a somewhat schematic fragmentary side elevation, partly in section, showing the paper feed and drive control therefor with the parts in non-driving relationship;

Fig. 40 is an enlarged fragmentary side elevation partly in section, of the paper feed roll shown in Fig. 39 in paper feeding position;

Fig. 41 is a fragmentary side elevation of the cantilever bag supporting plate raised to its upper limit with the bag bundle compressed in preparation for final wrapping of the paper wrap;

Fig. 42 is similar to Fig. 41 but shows the rear tucker fingers moved inwardly to wrap one depending portion of the paper about the bottom of the bundle and the cantilever supporting plate;

Fig. 43 is generally similar to Figs. 41 and 42 but shows both sets of tuckers in to complete the wrap formation of the paper about the bag bundle;

Fig. 44 shows the next step in sequence of the wrapping operation in which the rear tucker has been retracted and the wiping brush is being moved upwardly;

Fig. 45 shows the parts at the completion of the upward movement of the wiping brush and with the top bag-compression cylinder lifted to transfer bag compression to the paper wrapper;

Fig. 46 is a plan view of part of the mechanism shown in Fig. 45 and taken along line 46—46 thereof;

Fig. 47 is a perspective view of the completed bag bundle as banded and ready for final packing; and Fig. 48 is a fragmentary side elevation showing a modification by which manual means are provided for the initiation of a cycle of operation of the machine.

GENERAL

Figure 1:
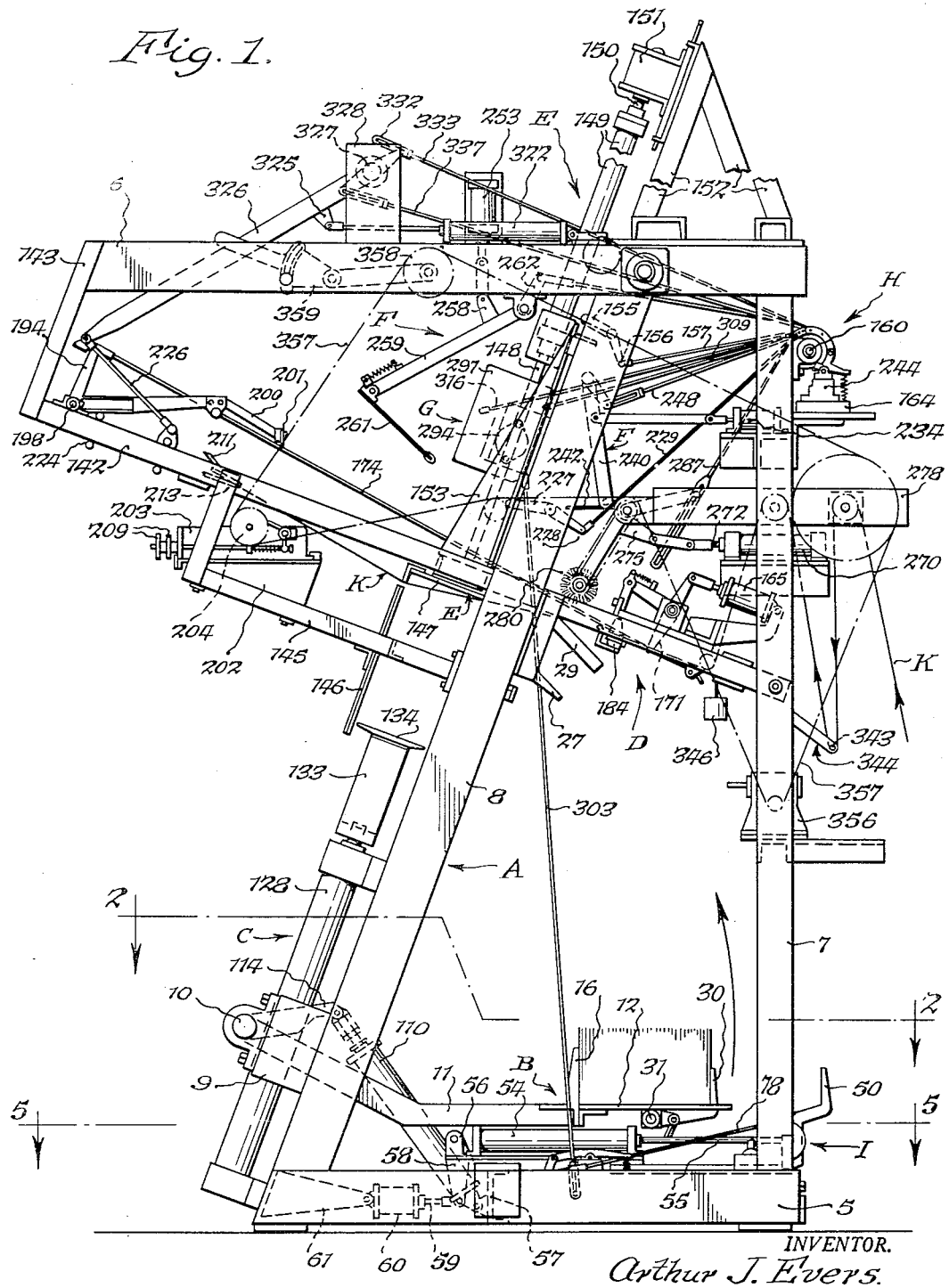
Fig. 1 is a side elevation of a machine constructed in accordance with this invention for automatically banding successively presented bundles of bags.
Figure 29:
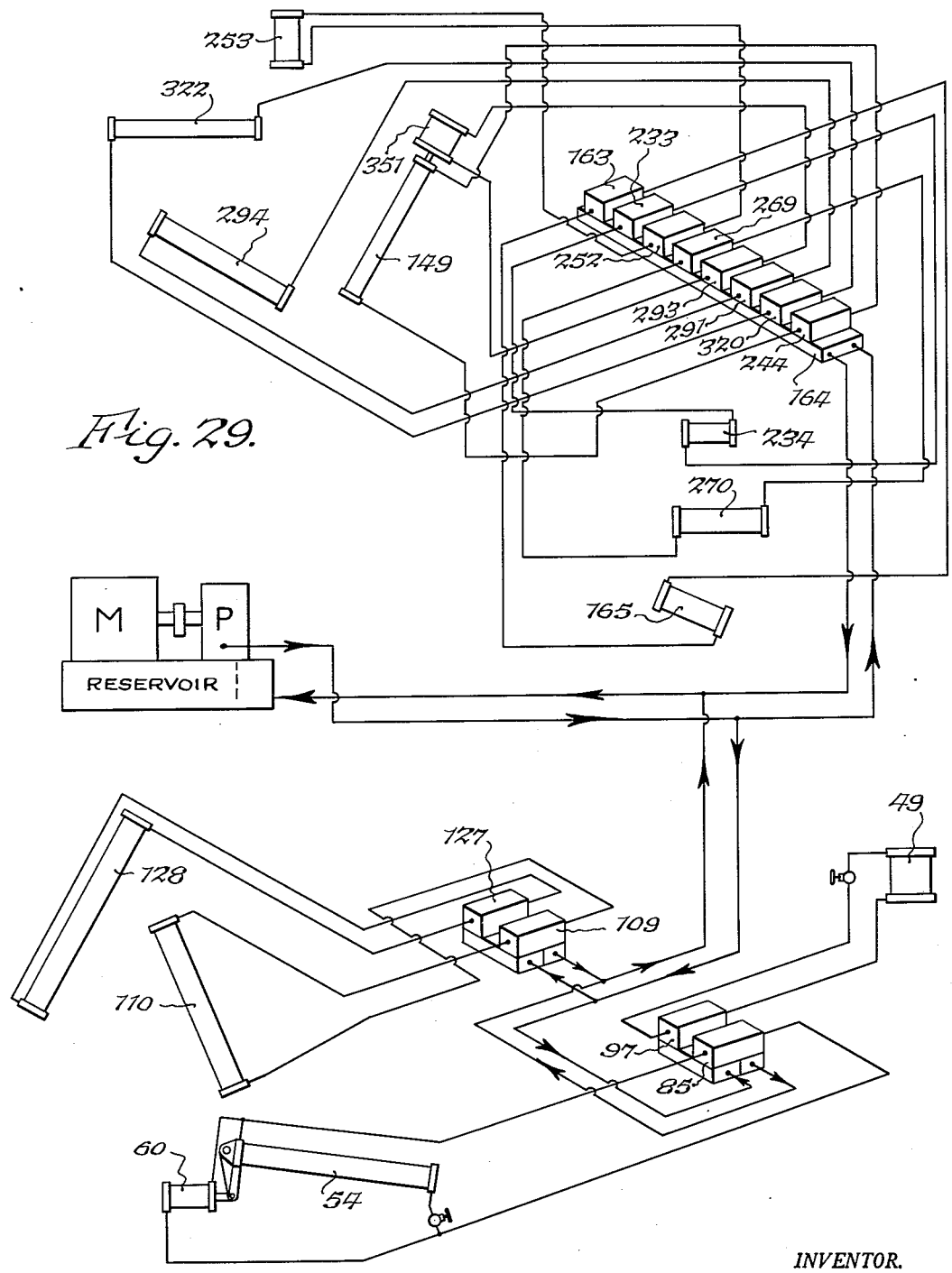
Fig. 29 is a schematic distorted perspective of the hydraulic piping to the valves and operating cylinders of the machine.

Referring to the drawings in detail, it will be noted that a preferred embodiment of this invention is illustrated in which the banding machine is fully automatic and is operatively connected to and timed with delivery devices of an associated bag transfer or bagmaking machine. This banding machine comprises generally a main frame A, a bag-receiving and transfer basket assembly B, an elevator C, paper feed and cut-off means D, an upper presser foot assembly E, paper tucking fingers and wiping brush F, a bundle ejector G, a ratchet indexed control valve assembly H, a main starting control assembly I, a pusher plate back stop and transfer or dividing fork assembly J for effecting proper positioning of the bags preparatory to their complete transfer as a loose bundle onto the basket assembly, and banding paper K.

In so far as possible the sequence of parts description herein will follow the sequence of one full cycle of operation of the machine. This machine is supported by the main frame A which includes two open side frames each having a bottom beam 5, a top beam 6, a vertical beam 7 and a slanting upper beam 8. These side frames are supported in spaced parallel relation by suitable transverse beams, some of which will be specifically hereinafter referred to in connection with other machine elements.

Basket assembly and control

The basket assembly B includes a pair of bearing brackets 9, 9 mounted on the end faces of the beams 8 (see Figs. 1, 2 and 3) which rotatably support a rock shaft 10. A pair of spaced parallel arms 11, 11 are rigidly affixed at one end to the rock shaft 10 and carry at their other ends a basket plate 12 extending therebetween and rigidly affixed thereto. The outer end (right end as viewed in Figs. 1 and 2) of the plate 12 is provided with a plurality of slots 13 and fingers 14 which are so spaced as to permit operable association of the basket plate with other machine elements, as will be hereinafter described. The inner end (left end as viewed in Fig. 2) of the plate 12 is provided with a plurality of apertures 15 adapted to receive a corresponding number of displaceable left-hand bracket fingers 16. As will be seen more particularly in Figs. 14 and 15 of the drawings, the fingers 16 are rigidly affixed to a transverse bar 17 carried by the free ends of a pair of spaced parallel arms 18, 18, the other ends of which are pivotally connected as at 19 to a corresponding pair of brackets 20, 20 affixed to the basket plate 12 adjacent the slotted or outer end thereof. A toggle generally indicated at 21 is connected between each bracket 20 and its associated arm 18 and includes a T-shaped member 22 pivotally connected at one end to the lower end of the bracket 20 as at 23 and at its other end to a link 24 which in turn is pivotally connected to the arm 18 as at 25. The pivotal connection 26 between the member 22 and the link 24 permits this pivoted end of the member 22 to ride against a lower cam bar 27 affixed to the inner face of the frame beam 8. The T-shape member 22 includes a laterally projecting lug or cam 28, the outer end of which is adapted to ride against an upper cam bar 29 secured to the frame beam 8 in near parallel relation to the lower cam bar 27. The foregoing toggle and cam bar arrangement is effective to retract the left basket fingers 16 from above the surface of the plate 12 during operation of the machine, as will be more fully set forth in the subsequent description of a complete operative cycle.

A plurality of displaceable right-hand basket fingers 30 are associated with the slots 13 of the basket plate 12 and are rigidly affixed to a rock shaft 31 rotatably mounted in a plurality of brackets 32 affixed to the underside of the basket plate. Two of the brackets 32 are provided with downward extensions which rotatably support another rock shaft 33. (See Figs. 11, 12, 13 and 13a.) A crank arm 34 is rigidly affixed to the rear end of the shaft 33 and is provided at its outer end with a roller follower 35 adapted to contact an abutment plate 36 secured to the rear frame member 8. A rock arm 37 is affixed to the rock shaft 33 and is pivotally connected at its outer end to one end of a pitman 38, the other end of which is connected to the free end of a rock arm 39 carried by the rock shaft 31. The front end of the rock shaft 33 carries another rock arm 40 (see Fig. 12) provided with a roller follower 41. The foregoing rock shaft and linkage connections provide means for propelling the right basket fingers 30 to a position above the plate 12 and retracting them therefrom as will be hereinafter more fully described in connection with the operation of the machine.

The back stop pusher plate and transfer or dividing fork assembly generally referred to above as J is used to effect collection of a number of groups of bags into a bundle and to slidably transfer the bundle completely onto the basket plate 12 where it is retained between the left fingers 16 and the right fingers 30. By reference particularly to Figs. 2, 3 and 4 of the drawings it will be seen that this assembly includes a pusher plate 42 operated by bag transfer apparatus such as that shown in my co-pending application Ser. No. 301,888, filed July 31, 1952, now U. S. Patent No. 2,729,151. The lower edge of the pusher plate 42 is provided with a plurality of slots aligned with the slots 13 of the basket plate 12 so that when the pusher plate is reciprocated to move individual groups of bags onto the leading or outer edge of the basket plate clearance is provided around the right hand basket fingers 30 so that they may be raised above the level of the basket plate without interfering with the operation of the pusher plate. As the bag groups are moved by the pusher plate 42 onto the basket plate 12 they are pushed against the yielding resistance of a displaceable back stop generally indicated at 43 which is provided with a plurality of depending fingers 44 mounted on a chain-biased carriage 45 movably supported on rails 46. The back stop is mounted on a rock shaft 47 of the associated bag transfer machine and is oscillatable through the medium of a rock arm 48 and an actuated cylinder 49.

After a sufficient number of groups of bags have been thus moved onto the basket plate 12 to form a loose bundle containing a predetermined number of bags means are provided to move the loose bundle completely onto the basket plate and to partially compress the same in preparation for the banding operations. To this end there is provided a bundle-dividing or transfer fork having a plurality of upwardly projecting fingers 50 (see Figs. 1, 2, 3, 4 and 5) secured to a slide bar 51 slidably mounted on a slideway 52. The slideway 52 is an extension of the outer end of a mounting plate 53 which carries a fork-actuating cylinder 54 having a piston rod 55 connected at its outer end to the midpart of the slide bar 51. The inner end of the mounting plate 53 is pivotally carried between a pair of brackets 56, 56 rigidly affixed to a transverse frame beam 57. An arm 58 is dependently and rigidly affixed to the inner end of the mounting plate 53 and is pivotally connected at its lower end to the outer end of a piston rod 59 of a fork-lifting cylinder 60 pivotally connected at its inner end to a bracket 61 rigidly affixed to a transverse beam 62 extending between the frame members 8 adjacent the bases thereof. From the foregoing description it will be apparent that the cylinder 54 will serve to provide reciprocatory motion to the fingers 50 of the dividing fork and the cylinder 60 will serve to oscillate the mounting plate 53 and the associated cylinder and dividing fork fingers about the pivot center of the brackets 56.

Since the function of the main starting control assembly I is merely to initiate movement of the back stop 43 out of its bag-engaging relationship and to effect the raising of the fingers 50 of the dividing fork into bag-engaging relation it would perhaps be desirable at this point to present a detailed description of this main starting control assembly. By reference particularly to Figs. 5, 8 and 10 of the drawings it will be seen that the main starting control assembly I is mounted upon a plate 63 affixed to the main frame A. A solenoid 64 is affixed to the plate 63 and is provided with a plunger 65 pivotally connected to the lower end of a link 66 which is pivotally connected at its upper end as at 67 to the outer end of a ratchet arm 68. The ratchet arm 68 carries a spring-biased pawl 69 engageable with a ratchet wheel 70 affixed to a transverse shaft 71 rotatably carried by brackets 72 secured to the mounting plate 63. A cam 73 provided with a drop-off shoulder 74 is affixed to the forward end of the shaft 71. An arm 75 is pivotally connected at its lower end to one of the brackets 72 and is provided intermediate its ends with a cam follower 76 which is adapted to be maintained in contact with the cam 73 through the action of a tension spring 77 extending between the upper end of the arm 75 and an adjacent portion of a bracket 72.

The upper end of the arm 75 is also pivotally connected to one end of a rod 78, the other end of which is provided with a lost motion link 79 pivotally connected as at 80 to a rock arm 81 carried by a shaft 82 for operating a toggle linkage generally indicated at 83 which is effective to cause rocking motion of the operating lever 84 of a reversible valve 85 for controlling operation of the divider fork which includes the fingers 50.

Similarly, the shaft 71 of the main control unit I carries at its rear end a cam 86 affixed thereto and provided with a drop-off shoulder 86a. An arm 87 is pivotally connected at its lower end to one of the brackets 72 and is provided intermediate its ends with a cam follower 88 adapted to be maintained in engagement with the cam 86 as by a tension spring 89 extending between the upper end of the arm 87 and an adjacent portion of the associated bracket 72. The upper end of the arm 87 is also pivotally connected at one end of a rod 90, the other end of which is provided with a lost motion link 91 pivotally connected as at 92 to the outer end of a rock arm 93 affixed to a rock shaft 94 which carries a toggle linkage generally indicated at 95 to effect rocking of an operating lever 96 of a reversible valve 97 which controls movement of the back stop 43 into and out of bag-engaging relationship.

The rock shaft 94 also carries a depending rock arm 98 rigidly affixed thereto and provided at its lower end with a roller follower 99. The follower 99 is adapted to be contacted by the end of an abutment bar 100 rigidly affixed to the slide bar 51 carrying the dividing fork fingers 50 and extends rearwardly therefrom or to the left as viewed in Figs. 5 and 8. In this manner the toggle 95 is recocked as a result of left-hand movement of the slide bar 51.

The actual timing of the above described main starting control I is dependent primarily on the number of teeth in the ratchet 70. The ratchet will be indexed one step forward each time the solenoid 64 becomes energized. The solenoid 64 is connected to a microswitch 101 (see Fig. 2) located in the path of travel of the pusher plate 42 and is normally open but is momentarily closed each time the pusher plate moves to the left in a bag-feeding direction. Consequently, if it is decided to build up a bundle of bags on the basket plate 12 by the accumulation of, say, fifty individual groups of bags the ratchet 70 should have fifty teeth. The cam 86 on the control shaft 71 will be so positioned that the cam follower 88 will drop off the shoulder 86a thereof at the forty-seventh indexing step to effect raising of the back stop through actuation of its control valve 97 and elevating cylinder 49. The cam 73 is so positioned on the shaft 71 that at the fiftieth indexing step of the ratchet the follower 76 will drop off the shoulder 74 thereof to break or uncock the toggle 83 and actuate the valve 85 to raise the fingers 50 of the dividing fork and to initiate lefthand movement thereof.

At the start of operations the basket B is at its lowermost position of travel so that the plate 12 thereof is horizontal. In returning to this position the lug 28 on each T-shaped element 22 contacts an upstanding lug 28a secured to the associate base frame member 5 in order to set or cock the toggle assembly 21 to raise the left basket fingers 16 to the position shown in Fig. 3 of the drawings.

The slide bar 51 of the dividing fork is provided with an adjustable abutment 102 aligned with the roller follower 41 (see Figs. 2, 5 and 12) which controls the raising and lowering of the right basket fingers 30. Thus as the fingers 50 of the dividing fork are moved to the left the abutment 102 contacts the follower 41 to effect partial rotation of the rock shaft 33 and the consequent raising of the basket fingers 30 to the position shown in Fig. 12.

The rear end of the slide bar 51 carries a leftwardly extending push rod 103 aligned with an abutment plate 104 affixed to the upper end of a rock arm 105 carried by a transversely extending rock shaft 106 (see Figs. 5 and 6). The rock shaft 106 is connected to a toggle linkage assembly generally indicated at 107 which in turn is connected to one end of an operating lever 108 of a reversible valve 109 adapted to control raising and lowering of the basket B.

The valve 109 is connected to an actuating or elevating cylinder 110 pivotally connected at its lower end to a bracket 111 secured to the transverse beam 57. The cylinder 110 contains a piston rod 112 pivotally connected as at 113 to the outer end of a rocker 114 affixed at its other end to the rock shaft 10.

The forward end of the rock shaft 10 is provided with a relatively short upstanding arm 115 which is pivotally connected to the upper end of a rod 116, the other end of which is provided with a lost motion link 117 pivotally connected as at 118 to the rock arm 81 which actuates the toggle linkage 83 of the dividing fork actuating control valve 85.

The rear end of the rock shaft 10 is provided with a relatively short depending arm 119 pivotally connected at its free end to the upper end of a rod 120, the lower end of which is provided with a lost motion link 121 pivotally connected as at 122 to a rock arm 123 carried by a rock shaft 124 having a toggle linkage generally indicated at 125, operably connected to an operating lever 126 which controls a reversible valve 127 for effecting operation of the elevator C.

Elevator

The elevator C includes a hydraulic cylinder 128 rigidly affixed to a pair of transverse frame members 129, 129 and is provided with a piston rod 130, the free end of which is attached to a cross-bar 131 of the elevator frame. A pair of longitudinal frame members 132, 132 are rigidly affixed to the ends of the cross-bar 131 and extend downwardly therebelow. A pair of arms 133, 133 extend upwardly from the cross-bar 131 and are rigidly affixed thereto and to the upper ends of the members 132. A plate 134 fabricated from spring steel or the like is rigidly affixed as at 135 to one of the arms 133 and is of sufficient length to span the entire distance between both arms 133. The other end of the plate 134 is unsecured, and the plate is so constructed that its free end is sprung upwardly a slight distance so that when there is no bundle of bags supported thereon its free end is slightly spaced from the upper end of the righthand arm 133 as viewed particularly in Fig. 17 of the drawings.

The left-hand elevator frame member 132 as viewed in Fig. 17 is provided with an elongated rectangular opening 136 at the lower end of which is an upwardly displaced cam flap 137, and a similar but oppositely directed cam flap 138 is formed on the lower end of the same frame element 132. A bracket 139 is rigidly secured to the main frame in alignment with the rectangular opening 136 and slidably supports a push rod 140, the outer end of which is provided with a roller follower 141 normally positioned within the area of the opening 136 for contact by the cam flaps 137 or 138. The other end of the push rod 140 is connected to the toggle 107 which initiates operation of the basket control valve 109. The function of the push rod 140 is to recock the toggle 107 and thus reset or reverse the basket control valve 109 to cause lowering of the basket from its raised to its lowered position preparatory to receiving the next bundle of bags.

A pair of rails 142 are dependably supported at their upper ends by hanger bars 143 depending from the upper frame members 6. The lower ends of the rails 142 are secured between the vertical frame members 7 as by stay bolts and sleeves indicated at 144 (see Figs. 1 and 31). The rails 142 are disposed at right angles to the axis of the elevator C and are positioned sufficiently far above the plate 134 thereof that a loose bundle of bags can be positioned on the plate. A supplementary frame 145 depends from the rails 142 and supports an abutment plate 146 against which the bag bundles are positioned as they are received onto the plate 134 of the elevator.

Presser foot

The path of travel of the banding paper K to be wrapped around the bag bundle support on the plate 134 passes immediately over the bag bundle and over the abutment plate 146. Immediately above the wrapping paper is positioned a presser foot 147 which is secured to the lower end of a piston rod 148 carried by a small diameter long stroke hydraulic cylinder 149, the upper end of which is connected to a piston rod 150 of a larger diameter short stroke hydraulic cylinder 151 rigidly affixed to an A-frame 152 mounted on top of the main frame A.

The presser foot includes side frame members 153 which prevent it from rotating as a result of engagement with a plate 154 secured between the main frame members 8 a substantial distance above the lowermost position of the presser foot as indicated in Fig. 18 of the drawings.

As the elevator C is raised the plate 134 thereof and the bags supported thereon are lifted into contact first with the paper to be banded therearound and then with the presser foot 147. Continued raising of the elevator causes the bag bundle to become compressed between the plate 134 and the presser foot 147 which also rises under the influence of the elevator until it reaches the maximum height.

As the presser foot 147 rises a follower (not shown) carried by one of the side frame members 153 thereof hits the free end of a rock arm 155 (see Figs. 1 and 18) journalled between the main frame members 8, the other end of which is pivotally connected as at 156 to one end of a pull rod 157, the other end of which (see Fig. 19) is pivotally connected as at 158 to a ratchet 159 mounted on a valve shaft 160 rotatably supported in bearings 161 secured to the vertical main frame members 7.

Pulling of the rod 157 in this manner indexes the ratchet 159 one step to effect a corresponding rotation in the valve shaft 160 whereupon a cam 162 becomes effective to actuate a valve 163 mounted upon a manifold 164 to operate the cut-off knife D.

It will be noted that the valve shaft 60 carries a plurality of pull rod actuated ratchets and a plurality of valve-controlling cams to sequentially actuate several of the mechanisms of this machine such as the paper cut-off knife, left and right tucker blades, bag bundle ejector and paper feed. Each of these will be hereinafter more fully described.

Fig. 20 is illustrative of the above mentioned ratchet assemblies. Fig. 21 is illustrative of the cam and valve assemblies and Figs. 22 through 28, inclusive, are detail views showing the specific cam contours for controlling the respective valves.

Cut-off knife

As will be seen by particular reference to Figs. 30 through 33 of the drawings the cut-off knife assembly includes a hydraulic actuating cylinder 165 the operation of which is controlled by the valve 163. The cylinder 165 is pivotally connected as at 166 to a mounting bracket 167 secured to a transverse brace 168 extending between the rails 142. The cylinder 165 carries a piston rod 169 pivotally connected as at 170 to the upper end of a rock arm 171 secured to a rock shaft 172. The lower end of the rock arm 171 is provided with a rearwardly projecting stud 173 pivotally connected to the lower end of a pitman 174 extending between it and the bail of the glueing mechanism, as will be hereinafter described.

The rock shaft 172 carries a pair of spaced arms 175, 175 pivotally connected at their outer ends as at 176 to a pair of depending arms 177, 177 to which is removably attached a knife blade 178. The upper ends of the arms 177 are each provided with a lug 179 pivotally connected to one end of a rod 180, the other end of which is slidably carried by a lug 181 secured to the rock arm 175. A compression spring 182 extends between the lugs 179 and 181 and tends to constantly bias the arms 177 and the associated knife blade 178 in a counterclockwise direction as viewed in Figs. 32 and 33. This biasing action maintains the lower edge of the knife blade 178 in contact with a guide 183 which directs movement of the knife blade into proper shearing position with respect to a stationary cutter blade or anvil 184.

The paper K is supported in spaced relation above the stationary blade 184 by a plate 185 having a plurality of spaced parallel spring fingers 186.

Mounted above the fingers 186 of the plate 185 are a plurality of clamping fingers 187 secured to a shaft 188 journalled in bearings 189 carried by the edges of the plate 185. A plurality of blocks 190 are secured to the shaft 188 and each pivotally supports a cam type paper stop plate 191. A link 192 has its lower end affixed to the shaft 188 and its upper end slidably engaged in a stud 193 pivotally affixed to the arm 175. In this manner as the arm 175 is lowered through counterclockwise rotation of the rock shaft 172 the link 192 is similarly lowered to bring the paper K down into close proximity with the stationary knife blade 184. Any tendency of the fingers 186 and 187 to move downwardly more slowly than the movable knife blade 178 causes relative sliding movement between the link 192 and the stud 193 which is reversed as soon as the movable knife blade contacts the paper immediately adjacent the ends of the fingers 186 and 187. In this manner the knife blade 178 actually carries the paper into contact with the stationary blade 184. The upward movement of the fingers 186 and 187 to the position shown in Fig. 32 is necessary in order to provide for feeding of an additional supply of paper for a subsequent banding operation as will be hereinafter more fully described.

The upper end of the pitman 174 (see Figs. 1 and 34) is received through the upper end of a rock arm 194 and is provided at its outer end with an adjustable abutment or stop clamp 195. The pitman 174 also carries a collar 196 and compression spring 197 to provide cushioning of the motion of the rocker 194 in one direction of movement. The lower end of the rock arm 194 is secured to a rock shaft 198 journalled in bearings 199 adjustably secured to the rails 142. A pair of spaced parallel arms 200 are secured to the rock shaft 198 and extend to the right as viewed in Figs. 1, 34 and 36. The outer ends of the arms 200 are spanned by a serrated comb bar 201 rigidly affixed thereto.

As the rock shaft 172 of the cut-off mechanism is rotated counterclockwise by actuation of the cylinder 165 the lower end of the rock arm 171 pulls the pitman 174 to effect a clockwise rotation of the rock shaft 198 and a consequent lowering of the comb bar 201 to the dotted line position shown in Fig. 34 where the teeth of the comb become engaged with the paper K which is brought into contact with the lands of the applicator roller of a glue-applying device.

Glue applicator

The glue-applying device includes a pair of brackets 202 affixed to the supplemental depending frame 145 and supports a generally rectangular open-top glue pot 203. A landed applicator roll 204 is journalled in bearings 205 formed in the side walls of the glue pot and is contacted by the teeth of a comb-type doctor blade 206 resiliently mounted as at 207 on a shaft 208 provided with knurled adjusting knobs 209 by which the pressure of contact between the blade 206 and the landed roll 204 may be regulated. It will be apparent that one of the mounting shaft and knob assemblies is provided adjacent each end of the doctor blade in order that exact adjustment may be effected across the full width of the applicator roll 204.

As the comb bar 201 is moved downwardly into contact with the paper K and the applicator roll 204 a roller follower 210 on each of the arms 200 contacts a toggle cocking lever 211 (see Figs. 34 and 35) to open the jaws of the paper gripper to release the paper K so that it may actually be wrapped around the bag bundle carried between the elevator plate 134 and the presser foot 147.

Paper grippers

The paper grippers include a pair of rock shafts 212, 212 to which are affixed a plurality of sets of gripper fingers 213 which are normally biased towards the paper gripping relationship as by compression springs 214 interposed between the ends of rock arms 215, 215 secured to the rock shaft 212. Each of the rock arms 215 is provided with a rearwardly or leftwardly extending lug 216 adapted to contact the heads of stop screws 217 which limit the amount of movement of the rock arms 215 and consequently the amount of oscillation of the rock shafts 212.

The cocking lever 211 is actually the longer arm of a bell crank lever, the shorter arm 218 of which is pivotally connected as at 219 to one end of a link 220 having its lower end pivotally connected as at 221 to an extension 222 of the lower rock arm 215. Thus the short arm 218 of the bell crank and the link 220 form a toggle for the opening and closing of the grippers 213.

The above described gripper assembly is mounted on a pair of carriages 223 provided with a plurality of rollers 224 engaged with the rails 142 so that the carriage and the associated grippers may be reciprocated therealong.

Each of the carriage members 223 is pivotally connected as at 225 to the lower end of a pitman 226 which is operatively connected to an actuating cylinder through mechanisms which will be hereinafter more fully described.

As the plate 134 of the elevator C continues to rise a frame member of the elevator strikes the free end of a rock arm 227 (see Figs. 1 and 18) journalled between the main frame members 8, the other end of which is pivotally connected as at 228 to one end of a pull rod 229 having its other end pivotally connected as at 230 to a ratchet 231 mounted on the valve shaft 160 to effect the second indexing step of the shaft 160 which resets the knife control valve 163 to return the cut-off knife to the position shown in Fig. 32 preparatory to a subsequent paper-cutting operation. The same second indexing of the shaft 160 by the pull rod 229 causes a cam 232 to become rotated sufficiently far to actuate a valve 233 which initiates tucking operation of the rear tucker fingers F.

Tucker fingers

Opening of the valve 233 admits fluid to a cylinder 234 secured to a bracket 235 mounted between the vertical frame members 7. The cylinder carries a piston rod 236 pivotally connected as at 237 to one end of a pitman 238, the other end of which is pivotally connected to a shaft 239 extending between a pair of depending arms 240 (see Fig. 42) secured to a rock shaft 241 journalled between the main frame members 8. The lower ends of the arm 240 pivotally support a set of rear or right-hand tucker fingers 242 which are effective to move the right-hand free end of the individual length of banding paper K from the free position shown in Fig. 41 to the tucked position shown in Fig. 42.

This same indexing step of the shaft 160 also causes a cam 243 to be rotated sufficiently far to actuate the control valve 244 to admit fluid to the lower portion of the narrow diameter long stroke cylinder 149 in order to hold the presser foot 147 at its upward limit of movement relative to the cylinder 149 and in preparation for the release of compression on the bag bundle following completion of the banding operation.

As shown in Figs. 41 and 42 of the drawings, a depending rock arm 245 is pivotally connected as at 246 to a lost motion link 247 of a pull rod 248. The other end of the pull rod 248 is pivotally connected as at 249 to a ratchet 250 on the shaft 160 and the pulling of the rod 248 by the rock arm 245 effects a third indexing step of the shaft 160 to rotate a cam 251 controlling a valve 252 which actuates the front or left-hand tucker fingers F. The valve 252 is connected with a hydraulic cylinder 253 carried by a bracket 254 supported by the upper main frame members 6. The cylinder 253 carries a piston rod 255 pivotally connected as at 256 to the upper end of a link 257 having its lower end pivotally connected to a lug 258 carried between a pair of depending arms 259 secured to a rock shaft 260 journalled beneath the main frame members 6. The lower ends of the arms 259 are provided with a plurality of front or left-hand tucker fingers 261 pivotally connected thereto in a manner similar to the rear or right-hand tucker fingers 242 carried by the arms 240. The tucker fingers 261 are effective to move the left-hand free portion of the individual length of wrapping paper K from the position shown in Figs. 41 and 42 to the position shown in Fig. 43.

The rock shaft 260 carries an upstanding rock arm 262 pivotally connected as at 263 to a lost motion link 264 secured to one end of a pull rod 265. The other end of the pull rod 265 is pivotally connected as at 266 to a ratchet 267 carried by the shaft 160. The pulling of the rod 265 by the rock arm 262 again indexes the shaft 160 to rotate the shaft sufficiently to cause the cam 232 to reset the valve 233 and retract the rear or right-hand tucker fingers 242 to the initial position illustrated in Fig. 41. This same indexing step of the shaft 160 also causes a cam 268 to rotate sufficiently far that it actuates a valve 269 to cause the brush assembly to be brought into wiping engagement with the outer free end of the band of paper K.

Brush

The valve 269 is connected with a hydraulic cylinder 270 carried by a bracket 271 supported between the vertical frame members 7. The cylinder 270 carries a piston rod 272 pivotally connected as at 273 to one end of a link 274, the other end of which is pivotally connected to a depending arm 275 carried between a pair of arms 276 which are secured to a rock shaft 277 journalled between a pair of secondary frame support members 278. The outer ends of the arms 276 rotatably support a shaft 279 which carries a brush 280 which is adapted to contact the banding paper K, as indicated in Fig. 44 of the drawings. The rock shaft 277 carries a freely rotatable sprocket gear, indicated at 281, which is connected with a similar gear, indicated at 282, as by a sprocket chain 283 in order that the brush 280 may be positively rotated through the medium of driving connections which will be hereinafter more fully described.

It may be mentioned that the hydraulic cylinder 270 preferably is of such a construction that it includes an inner valve which provides for an initially rapid movement of the piston rod 272 which decreases in its speed of motion as it approaches the end of a stroke. In this manner the brush 280 is first moved rapidly towards contact with the paper K about the bag bundle and then slowed down as the brush actually reaches contact with the paper. In this manner a gentle wiping action of the free or tail end of the band paper is effected, and the timing is such that the glue which has been applied thereto will bond with the underlying layer of paper sufficiently well that no slippage will take place when the presser foot 147 is raised from its bundle-compressing position.

The rock shaft 277 carries a depending arm 284 pivotally connected as at 285 to a lost motion link 286 secured to the lower end of a pull rod 287. The upper end of the rod 287 is pivotally connected as at 288 to a ratchet 289 carried by the shaft 160. As the brush 280 approaches its upper limit of movement as shown in Fig. 44 the arm 284 becomes effective to pull the rod 287 and effect a further indexing of the shaft 160. This causes the cam 268 to reset the control valve 269 and reverse the action of the hydraulic cylinder 270 to return the brush 280 to its initial position. At the same time this indexing step of the shaft 160 causes a cam 290 mounted on the shaft to actuate a control valve 291 to initiate motion of the bundle-ejecting mechanism. Simultaneously, a cam 292 mounted on the shaft 160 becomes effective to initiate action of a control valve 293 to actuate the short stroke hydraulic cylinder 151 to lift the presser foot 147 from engagement with the bag bundle, as indicated in Fig. 45 of the drawings.

Bundle ejector

The control valve 291 is connected to a hydraulic cylinder 294 which is carried by a mounting bracket 295 secured to the frame member 8, as indicated in Fig. 46 of the drawings. The cylinder 294 carries a piston rod 296 provided at its free end with a pusher plate 297 which is adapted to move the banded bag bundle from its engagement with the cantilever supporting plate 134. The pusher plate 297 carries a relatively long rearwardly extending rod 298 disposed in parallelism with the axis of the cylinder 294 and provided at its free end with an abutment or trip collar 299. As the pusher plate is moved in a direction to eject the banded bundle from its engagement on the plate 134 the abutment 299 first contacts the upper arm 300 of a bell crank lever which is pivotally connected to the mounting bracket 295 as at 301. The other arm 302 of the bell crank lever is pivotally connected to the upper end of a pull rod 303, the lower end of which (see Figs. 5 and 6) is provided with a lost motion link 304 pivotally connected as at 305 to the rock arm 123 in order to reset the elevator valve 127 and effect lowering of the elevator to its initial position.

As the pusher plate 297 reaches its limit of bundle-ejecting movement the abutment 299 contacts an arm of a bell crank pivotally connected as at 307 to a suitable part of a main frame member 8. The other arm 308 of the bell crank is pivotally connected to one end of a pull rod 309, the other end of which is pivotally connected as at 310 to a ratchet 311 mounted on the shaft 160. This effects a further indexing step of the shaft 160 to reset or reverse the control valve 291 as a result of further rotation of the cam 290 and return the pusher plate 297 to its initial position, as shown in Fig. 46.

The rear face of the pusher plate 297 is provided with an adjustable abutment 312 which on the return stroke of the cylinder 294 contacts an arm 313 of a bell crank which is pivotally connected as at 314 to the mounting bracket 295. The other arm 315 of the bell crank is pivotally connected to one end of a pull rod 316, the other end of which is pivotally connected as at 317 to a ratchet 318 carried by the shaft 160. Pulling of the rod 316 as a result of the return motion of the pusher plate 297 again indexes the shaft 160 to cause a cam 319 to rotate sufficiently far as to actuate a control valve 320 to initiate the feeding of a fresh supply of paper for the next banding operation.

It will be evident from Fig. 46 of the drawings that as the banded bag bundle is ejected from its engagement with the plate 134 it becomes supported on a plate 321 projecting laterally from the front frame member 8. Each successive bag bundle thus ejected from the machine will cause the preceding bundle to be moved further along the plate 31 which may, of course, be connected to any suitable type of gravity or power driven discharge conveyor.

*Paper feed and end of operation cycle*

The valve 320 which controls the action of the paper feed devices is connected to a hydraulic cylinder 322 which is pivotally connected at one end to a mounting bracket 323 supported on the upper main frame member 6. The cylinder 322 is provided with a piston rod 324 which is pivotally connected to a lug 325 carried between a pair of depending arms 326 secured to a rock shaft 327 journalled in a pair of upstanding brackets 328 fastened to the upper frame members 6. The lower ends of the arms 326 are pivotally connected as at 329 to the upper end of the pitmans 226 (see Figs. 30 and 34).

The rock shaft 327 also carries an upwardly projecting arm 330 which is pivotally connected as at 331 to a lost motion link 332 carried on one end of a pull rod 333, the other end of which is pivotally connected as at 334 to a ratchet 335 carried by the shaft 160.

As the rock shaft 327 is rotated counterclockwise as viewed in Fig. 30, through actuation of the hydraulic cylinder 322 the arm 330 pulls the rod 333 to effect a further indexing movement of the shaft 160 which rotates the cam 319 an additional amount sufficient to reverse the action of the control valve 320 and cause return of the paper feed carriage to its lefthand position, as indicated in Figs. 1 and 34 of the drawings.

As the paper feed carriages 223 reach the righthand limit of movement, as shown in Fig. 30, the locked toggle formed by the bell crank arm 218 and the link 20 contacts an abutment stop 336 (see Fig. 35) to uncock the toggle and permit the gripper fingers 213 to clamp the leading end of the fresh supply of banding paper K.

Clockwise rotation of the rock shaft 327 to feed a fresh supply of paper K and to move the paper feed carriages 223 to the left causes yet another indexing step of the shaft 160 through a pull rod 337 which has one end pivotally connected as at 338 to one of the depending arms 326 and its other end pivotally connected as at 339 to a ratchet 340 carried by the shaft 160. This particular indexing step of the shaft 160 causes both of the cams 243 and 292 to be further rotated a distance sufficient to reverse the respective control valves 244 and 293 to lower the presser foot 147 to its initial position through actuation of the cylinders 149 and 151.

At the beginning of the paper feed stroke the sheet from the supply roll of paper is in the position indicated in Figs. 1, 30, 36 and 39 of the drawings, with the lead end of the paper K being held beneath the fingers 187 at the cut-off station. Tracing the path of travel of the paper from this point back to the supply roll the sheet first passes under an idler roller 341 journalled between supplementary frame member 142 and thence upwardly over an idler roller 342 journalled between the vertical main frame members 7 at the level of the frame support members 278. The paper then is directed downwardly under a transverse bar 343 which is part of a bail generally indicated at 344 pivotally mounted as at 345 between the frame members 142. The bail 344 is counterbalanced by a weight 346 in order that control of the paper feed may be more readily effected, as will be hereinafter described.

From the bar 343 the paper passes upwardly around a constantly driven roller 347 journalled between the frame members 278 and thence downwardly to the supply roll. Spaced brackets 348 affixed to the frame members 278 carry a rock shaft 349 which carries an eccentrically mounted rubber covered idler roll 350. A rock arm 351 provided with a counterbalance 352 is secured to the rock shaft 349. The free end of the rock arm 351 is pivotally connected to the upper end of a connecting link 353, the lower end of which is slidably received by a pivotally mounted cross bar or rod 354 extending between the side members of the bail 344. Downward limit of movement of the bail 344 with respect to the link 353 is effected by a stop collar 355 adjustably secured to the link.

After the grippers 213 of the paper feed carriage have gripped the lead end of the paper K and move to the left as viewed in Figs. 30 and 36 the slack in the pendant loop of supply paper passing under the bail bar 343 is pulled out and also the bail is lifted upwardly. This movement relieves the pull on the link 353 extending between the bar 354 and the rock arm 351 to permit the counter balance 352 to become effective to slightly oscillate the rock shaft 349 in a clockwise direction to bring the eccentrically mounted roll 350 into driving or paper feeding contact with the paper passing over the driven roll 347. It may be noted that the roll 347 is polished so that at all times when the idler roll 350 is not in contact with the paper no feed of the paper will take place.

The feed of the paper is stopped by return of the bail 344 to its lower position, dragging a loop of paper with it as a result of its passage around the bar 343, so that the connecting link 353 is pulled downwardly to oscillate the rock shaft 349 a slight amount in a counterclockwise direction to lift the roller 350 from engagement with the paper.

The driven roller 347, the glue applicator roll 204 and the brush 280 are all adapted to be constantly rotated from an auxiliary reduction gear motor 356 mounted between the main frame members 7 through a sprocket chain schematically indicated at 357. One of the sprocket gears which carries the chain 357 may be an idler gear 358 (see Fig. 1) carried by an adjustable mounting means 359 to provide for suitable adjustments in the tension of the sprocket chain as it passes around the several gears being driven.

In Fig. 48 of the drawings there is shown a slight modification of this machine in which the main starting control assembly I has been eliminated and a manually operable lever 360 is connected to the pull rod 78 for actuation of the valve 85 to raise the dividing fork fingers 50. A second manually operable lever 361 is connected to the pull rod 90 to actuate the valve 97 and effect lifting of the back stop J. The pusher plate 42 and its associated structure have been replaced by a stationary guide plate 370 against which the bags can rest before the fingers 50 of the dividing fork are moved into bag bundle-engaging position. It will be understood that the plate 370 is provided with a plurality of slots (not shown) to permit passage of the basket fingers 30 and the fork fingers 50. In this way the present machine can be easily adapted for the manual placing of bag bundles upon the basket B and then the banding operation may be started manually by pulling the levers 360 and 361, after which the banding operation will be effected completely automatically.

It is, of course, to be understood that various details of arrangements and proportions of parts may be modified within the scope of the appended claims.

I claim:

1. In a machine for banding bundles of paper bags, a basket for supporting a loose bundle of bags, means for depositing on said basket a predetermined number of bags, means effective after a loose bundle of bags has been deposited on said basket for moving said basket to a band-applying station, two separately movable sets of fingers for retaining said loose bundle on said basket while said basket is being moved to said band-applying station, means for retracting said fingers from their bundle-engaging positions as said basket reaches said band-applying station, an elevator for receving said loose bundle from said basket, means for positioning a predetermined length of sheet banding material at the band-applying station, a limitedly movable presser foot overlying said banding material, means to raise said elevator whereby to compress said bag bundle against said banding material and said presser foot, means for returning said basket to its bag bundle-receiving position, means for applying and securing said banding material around said compressed bundle, means for lifting said presser foot an amount sufficient to release the externally applied compression from said bag bundle, and means for ejecting the banded bundle from the machine.

2. A machine in accordance with claim 1 in which the banding material positioning means includes a feed carriage reciprocable along a plane substantially normal to the axis of said elevator, a plurality of grippers mounted on said carriage for holding one end of said banding material, means for opening and closing said grippers, and means for reciprocating said carriage.

3. A machine in accordance with claim 1 in which the banding material positioning means includes a feed carriage reciprocable along a plane substantially normal to the axis of said elevator, a plurality of grippers for holding one end of said banding material, means for opening and closing said grippers, and means for reciprocating said carriage; and in which the banding material applying means includes a plurality of sequentially operable tucking fingers.

4. In a machine of the character described, an elevator including a cantilever-mounted plate for supporting a bundle of bags to be banded, a presser foot overlying said plate and normally spaced therefrom a distance not less than the height of a bag bundle to be banded, said presser foot being freely movable upwardly a predetermined distance, means for interposing a predetermined length of sheet banding material between said plate and said presser foot, and means for raising said elevator to first move a bag bundle supported on the plate thereof into contact with said sheet banding material and then to compress the bag bundle against the resistance of said presser foot as said presser foot reaches its upper limit of free movement.

5. In a machine of the character described, an elevator including a cantilever-mounted plate for supporting a bundle of bags to be banded, a presser foot overlying said plate and normally spaced therefrom a distance not less than the height of a bag bundle to be banded, said presser foot being freely movable upwardly a predetermined distance, means for interposing a predetermined length of sheet banding material between said plate and said presser foot, means for raising said elevator to first move a bag bundle supported on the plate thereof into contact with said sheet banding material and then to compress the bag bundle against the resistance of said presser foot as said presser foot reaches its upper limit of free movement, means for applying and securing said banding material around said compressed bag bundle and said plate, means for releasing the externally applied compression from the banded bundle, means for ejecting the banded bundle from said plate, and means for lowering said elevator to its initial position.

6. A machine in accordance with claim 5 in which the banding material interposing means includes a feed carriage reciprocable along a plane substantially normal to the axis of said elevator, a plurality of grippers mounted on said carriage for holding one end of said banding material, means for opening and closing said grippers, a second set of stationary grippers for holding the other end of said banding material, means located adjacent said stationary grippers for severing said banding material concurrently with the opening of said carriage-mounted grippers, and means for reciprocating said carriage.

7. A machine in accordance with claim 5 in which the banding material applying means includes a plurality of sequentially operable tucking fingers.

8. A machine in accordance with claim 5 in which the banding material interposing means includes a feed carriage reciprocable along a plane substantially normal to the axis of said elevator, a plurality of grippers mounted on said carriage for holding one end of said banding material, means for opening and closing said grippers, a second set of stationary grippers for holding the other end of said banding material, means located adjacent said stationary grippers for severing said banding material concurrently with the opening of said carriage-mounted grippers, and means for reciprocating said carriage; and in which the banding material applying means includes a plurality of sequentially operable tucking fingers.

9. In a machine of the character described, an elevator including a cantilever-mounted plate for supporting a bundle of bags to be banded, a presser foot overlying said plate and normally spaced therefrom a distance not less than the height of a bag bundle to be banded, said presser foot being freely movable upwardly a predetermined distance, means for interposing a predetermined length of sheet banding material between said plate and said presser foot, a basket for supporting a loose bundle of bags, means for depositing on said basket a predetermined number of bags to form a loose bundle, means for moving said basket from its bag-receiving position to a position adjacent the supporting plate of said elevator whereby to deposit said loose bundle thereon, displaceable means for retaining said loose bundle on said basket while said basket is being moved, means for raising said elevator to first move said loose bundle into contact with said sheet banding material and then to compress the bag bundle against the resistance of said presser foot as said presser foot reaches its upper limit of free movement, means for returning said basket to its initial position, means for applying and securing said banding material around said compressed bag bundle and said supporting plate, means for releasing the externally applied compression from the banded bundle, means for ejecting the banded bundle from said plate, and means for lowering said elevator to its initial position.

10. In a machine of the character described, an elevator including a cantilever-mounted plate for supporting a bundle of bags to be banded, a presser foot overlying said plate and normally spaced therefrom a distance not less than the height of a bag bundle to be banded, said presser foot being freely movable upwardly a predetermined distance, a supply roll of sheet banding material, means for withdrawing a predetermined length of banding material from the supply roll thereof and positioning said material immediately beneath said presser foot, a basket for supporting a loose bundle of bags, means for depositing on said basket a predetermined number of bags to form a loose bundle, means for moving said basket from its bag-receiving position to a position adjacent the supporting plate of said elevator whereby to deposit said loose bundle thereon, displaceable means for retaining said loose bundle on said basket while said basket is being moved, means for raising said elevator to first move said loose bundle into contact with said sheet banding material and then to compress the bag bundle against the resistance of said presser foot as said presser foot reaches its upper limit of free movement, means for returning said basket to its initial position, means for applying and securing said banding material around said compressed bag bundle and said supporting plate, means for releasing the externally applied compression from the banded bundle, means for ejecting the banded bundle from said plate, and means for lowering said elevator to its initial position.

11. A machine in accordance with claim 10 in which the banding material positioning means includes a feed carriage reciprocable along a plane substantially normal to the axis of said elevator, a plurality of grippers mounted on said carriage for holding the lead end of said banding material, means for opening and closing said grippers, a second set of stationary grippers for holding said banding material adjacent the line of cut-off therefor, means located adjacent said stationary grippers for severing said banding material substantially concurrently with the opening of said carriage-mounted grippers, and means for reciprocating said carriage.

12. A machine in accordance with claim 10 in which there is provided means located adjacent the lead end of said sheet banding material for applying adhesive to the under side of said lead end.

13. A machine in accordance with claim 10 in which the banding material positioning means includes a feed carriage reciprocable along a plane substantially normal to the axis of said elevator, a plurality of grippers mounted on said carriage for holding the lead end of said banding material, means for opening and closing said grippers, a second set of stationary grippers for holding said banding material adjacent the line of cut-off therefor, means located adjacent said stationary grippers for severing said banding material substantially concurrently with the opening of said carriage-mounted grippers, and means for reciprocating said carriage; and in which the banding material applying means includes a plurality of sequentially operable tucking fingers engageable with the free ends of the length of banding material after severing thereof from its supply has been effected.

References Cited in the file of this patent
UNITED STATES PATENTS

| | | |
|---|---|---|
| 1,261,612 | Powers | Apr. 2, 1918 |
| 1,629,841 | Saxton | May 24, 1927 |
| 1,659,313 | Cranston | Feb. 14, 1928 |